(12) United States Patent
Vajapey et al.

(10) Patent No.: US 10,489,918 B1
(45) Date of Patent: Nov. 26, 2019

(54) VIDEO OBJECT TRACKING

(71) Applicant: Figure Eight Technologies, Inc., San Francisco, CA (US)

(72) Inventors: Kiran Vajapey, San Francisco, CA (US); Robert Munro, San Francisco, CA (US); Joseph Richard Cloughley, San Francisco, CA (US); Matthew Allen Gordon, San Francisco, CA (US); Humayun Irshad, Sunnyvale, CA (US); Monchu Chen, Mountain View, CA (US); Seyyedeh Qazale Mirsharif, San Francisco, CA (US); Caiqun Xiao, Cupertino, CA (US)

(73) Assignee: Figure Eight Technologies, Inc., San Francisco, CA (US)

( * ) Notice: Subject to any disclaimer, the term of this patent is extended or adjusted under 35 U.S.C. 154(b) by 0 days.

(21) Appl. No.: 16/228,579

(22) Filed: Dec. 20, 2018

Related U.S. Application Data

(60) Provisional application No. 62/669,259, filed on May 9, 2018.

(51) Int. Cl.
*G06K 9/00* (2006.01)
*G06T 7/20* (2017.01)
*G06T 7/70* (2017.01)

(52) U.S. Cl.
CPC .............. *G06T 7/20* (2013.01); *G06T 7/70* (2017.01); *G06T 2207/20081* (2013.01); *G06T 2207/20092* (2013.01)

(58) Field of Classification Search
None
See application file for complete search history.

(56) References Cited

U.S. PATENT DOCUMENTS 6,901,110 B1 * 5/2005 Tsougarakis ........... H04N 5/145
348/E5.066
8,085,982 B1 * 12/2011 Kim .................. G06K 9/00261
382/100

(Continued)

FOREIGN PATENT DOCUMENTS

WO 2003019418 A1 3/2003
WO 2017164947 A1 9/2017

OTHER PUBLICATIONS

Vondrick et al., Efficiently Scaling up Crowdsourced Video Annotation, A Set of Best Practices for High Quality, Economical Video Labeling, International Journal of Computer Vision Manuscript, Oct. 31, 2011.

(Continued)

*Primary Examiner* — Hadi Akhavannik
(74) *Attorney, Agent, or Firm* — Van Pelt, Yi & James LLP

(57) ABSTRACT

A technique is disclosed for automating tracking of annotated objects and improves the throughput and efficiency of existing methods while maintaining a degree of accuracy comparable to a human annotator. In particular, the disclosed technique provides an automated annotated object tracking tool that allows machine-learning teams to annotate an object within a frame and have that annotation persist across frames as the annotated object is tracked within a series of frames, still ensuring that every frame is accurately reviewed by a human where high quality annotation is required. This technique incorporates human feedback via a user adjustment that allows the tool to adapt and improve its accuracy in tracking an annotated object across a sequence of frames.

19 Claims, 12 Drawing Sheets

(56) References Cited

U.S. PATENT DOCUMENTS

| | | | |
|---|---|---|---|
| 8,769,396 B2 | 7/2014 | Chen | |
| 9,354,763 B2 | 5/2016 | Latulipe | |
| 9,767,087 B1 | 9/2017 | Petrov | |
| 10,241,588 B1* | 3/2019 | Misra | G06F 3/017 |
| 2014/0347263 A1* | 11/2014 | Dai | G06F 3/017 |
| | | | 345/156 |
| 2016/0026898 A1* | 1/2016 | Abad | G06K 9/00785 |
| | | | 382/103 |
| 2016/0140727 A1* | 5/2016 | Yilmaz | G06K 9/46 |
| | | | 382/103 |
| 2017/0100101 A1* | 4/2017 | Ryoo | A61B 8/085 |
| 2017/0168709 A1* | 6/2017 | Zhong | G06T 7/11 |
| 2018/0012082 A1* | 1/2018 | Satazoda | G06K 9/00805 |
| 2018/0129742 A1* | 5/2018 | Li | G06K 9/00771 |
| 2018/0364717 A1* | 12/2018 | Douillard | G05D 1/024 |

OTHER PUBLICATIONS

RSIP Vision, Global Leader in Computer Vision and Deep Learning, Object Tracking in Videos, Mar. 6, 2017, retrieved from: https://www.rsipvision.com/object-tracking-in-videos/.

\* cited by examiner

VIDEO OBJECT TRACKING

CROSS REFERENCE TO OTHER APPLICATIONS

This application claims priority to U.S. Provisional Patent Application No. 62/669,259 entitled VIDEO OBJECT TRACKING filed May 9, 2018, which is incorporated herein by reference for all purposes.

BACKGROUND OF THE INVENTION

Training machine learning models to recognize and distinguish particular objects from each other, for example, to recognize that an object is a car or a person, requires a large number of examples, each example depicting a car or a person. To generate large data sets required for training and building machine learning models, existing techniques have often required human operators to manually annotate objects in each frame of a video. While typically accurate, this process of manually annotating each object in a video on a frame by frame basis is laborious, time-consuming, and costly. Using manual processes, the cost and time required to annotate individual frames in video is prohibitive and makes artificial intelligence (AI) applications that need to understand objects moving through time and space untenable.

Accordingly, it would be advantageous to provide a solution to the problem of annotating large volumes of images to generate large amounts of data for training machine learning models for various applications that improves throughput and efficiency without sacrificing accuracy. In particular, a technique for annotating an object in a video and automatically tracking the annotated object through subsequent frames of the video to provide accurate annotation of objects that can be used as training data for machine learning models, but with increased throughput and reduced cost as compared with manual annotation, would provide advantages and benefits over existing techniques. Moreover, to ensure accurate annotations of video content, it is critical to incorporate human feedback into a technique that provides an automated annotated object tracking capability.

BRIEF DESCRIPTION OF THE DRAWINGS

Various embodiments of the invention are disclosed in the following detailed description and the accompanying drawings.

DETAILED DESCRIPTION

Figure 1:
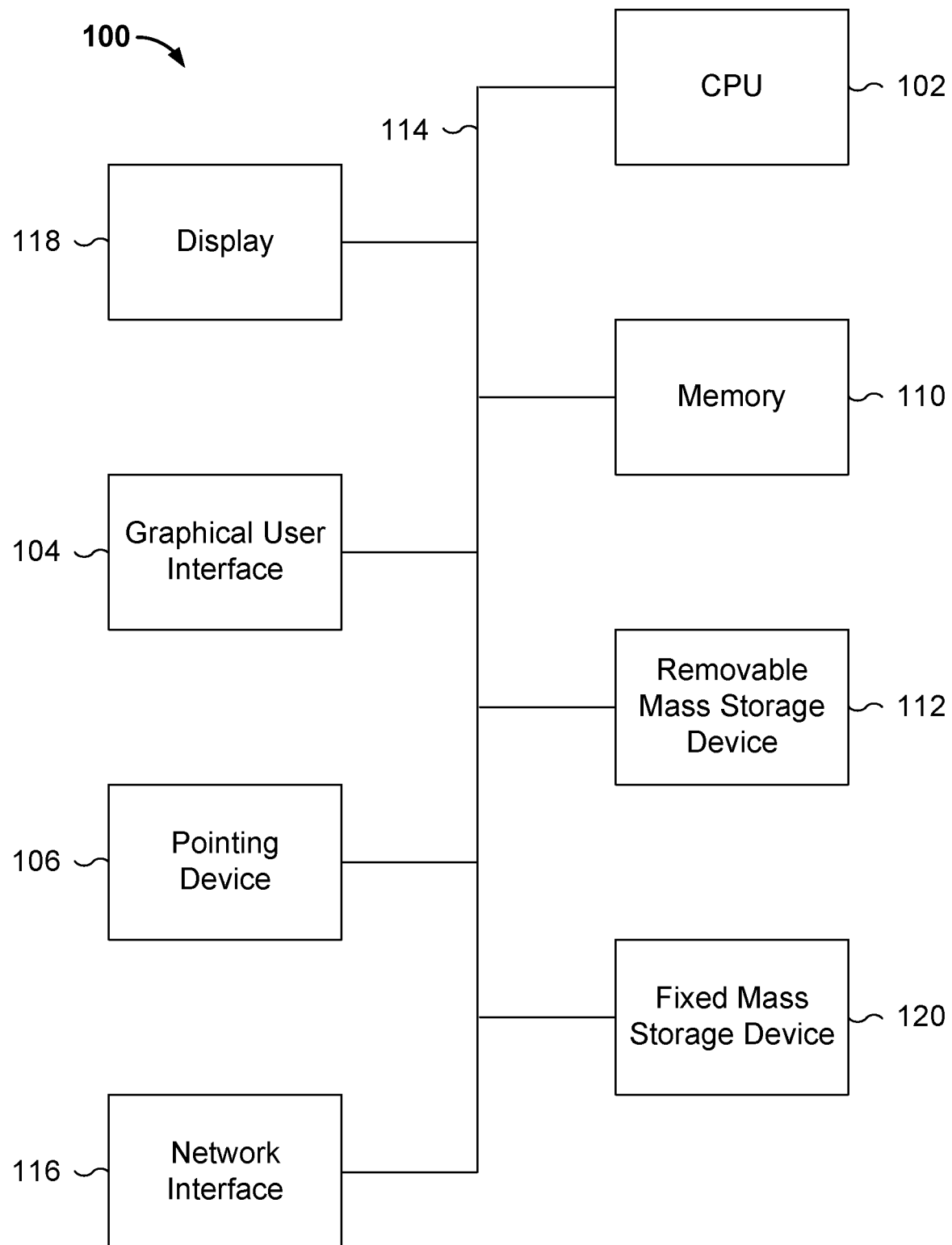
FIG. 1 is a block diagram of a computer system used in some embodiments to perform annotation and object tracking, including video annotation and video object tracking.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In machine learning applications, training data is needed to train the machine learning model. For example, deep learning models require data sets for training (e.g., adjusting weights in a neural net model) in order to recognize particular objects such as cars and people. One of the challenges in machine learning is collecting and preparing a large number of training data. The collection and preparation of datasets used for training machine-learning models to recognize particular objects is often performed by manually annotating the objects of interest in a video and labeling the objects frame by frame, or by skipping some frames and linearly interpolating in order to track the same object over a series of frames. Some approaches use basic algorithms in an attempt to automatically move an annotation between video frames based on the image content in the video frame itself but fail to provide a feedback loop for human input to improve object tracking. Given that video is a growing data format with over 500,000 hours of video uploaded and 1 billion hours of video consumed on YouTube every day, it would be advantageous to have a tool that improves throughput, efficiency, and cost of reviewing and annotating large volumes of video and incorporates human input to produce a better result.

The disclosed technique allows machine-learning teams to annotate an object within a frame, such as a video frame, and then have that annotation persist across frames as the annotated object is tracked within a video or a series of frames, still ensuring that every frame is accurately reviewed by a human where high quality annotation is required. This automated annotated object tracking capability is essential to annotate content, including video content, at scale in applications such as autonomous vehicles, security surveillance, and media entertainment. Without the automated annotated object tracking capability, the cost and time required to annotate individual frames in applications such as video is prohibitive and makes artificial intelligence (AI) applications that need to understand objects moving through time and space untenable.

Accordingly, a technique is provided for annotation that can be used for automated video annotated object tracking. In some embodiments, the disclosed technique includes a system comprising a processor configured to: present a first frame in a series of pre-recorded frames; receive a first annotation of a first bounding region of an object in the first frame; obtain a second bounding region of the object in a second frame in the series of frames based at least in part on a prediction of the location of the object in the second frame; and output the second bounding region. In addition, the system can comprise one or more interfaces, wherein at least one interface is configured to display a frame and/or to receive an annotation. Note that while some of the embodiments described herein are applied to a series of pre-recorded frames (e.g., obtained from processing a pre-recorded video to break it into a series of pre-recorded video frames), the disclosed technique is not limited to video frames or video annotation, but can be applied to annotate and track objects of interest appearing in other types of frames and sequences of frames.

FIG. 1 is a block diagram of a computer system 100 used in some embodiments to perform annotation and object tracking, including video annotation and video object tracking. In particular, FIG. 1 illustrates one embodiment of a general purpose computer system. Other computer system architectures and configurations can be used for carrying out the processing of the disclosed technique. Computer system 100, made up of various subsystems described below, includes at least one microprocessor subsystem (also referred to as a central processing unit, or CPU) 102. That is, CPU 102 can be implemented by a single-chip processor or by multiple processors. In some embodiments, CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as is well known in the art, primary storage typically includes basic operating instructions, program code, data, and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storages 112, 120 generally store additional programming instructions, data, and the like that typically are not in active use by the CPU 102. It will be appreciated that the information retained within mass storages 112, 120 may be incorporated, if needed, in standard fashion as part of primary storage 110 (e.g., RAM) as virtual memory.

In addition to providing CPU 102 access to storage subsystems, bus 114 can be used to provide access to other subsystems and devices as well. In the described embodiment, these can include a display 118, a network interface 116, a graphical user interface 104, and a pointing device 106, as well as an auxiliary input/output device interface, a sound card, speakers, and other subsystems as needed. The pointing device 106 may be a mouse, stylus, track ball, or tablet, and is useful for interacting with graphical user interface 104.

In some embodiments, a video or series of images is received as an input to the computer system 100 and CPU 102 pre-processes the video or series of images to break up the video or series of images into frames that can be displayed on display 118. In these embodiments, graphical user interface 104 is configured to display a frame and to receive an annotation. As an example, a user can use the pointing device 106 to annotate a frame displayed on display 118. CPU 102 is configured to present a first frame in a series of pre-recorded frames; receive a first annotation of a first bounding region of an object in the first frame; obtain a second bounding region of the object in a second frame in the series of frames based at least in part on a prediction of the location of the object or the object's location in the second frame; and output the second bounding region.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the disclosed technique may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the disclosed technique further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the disclosed technique, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the disclosed technique. Other computer systems suitable for use with the disclosed technique may include additional or fewer subsystems. In addition, bus 114 is illustrative of any interconnection scheme serving to link the subsystems. Other computer architectures having different configurations of subsystems may also be utilized.

Figure 2:
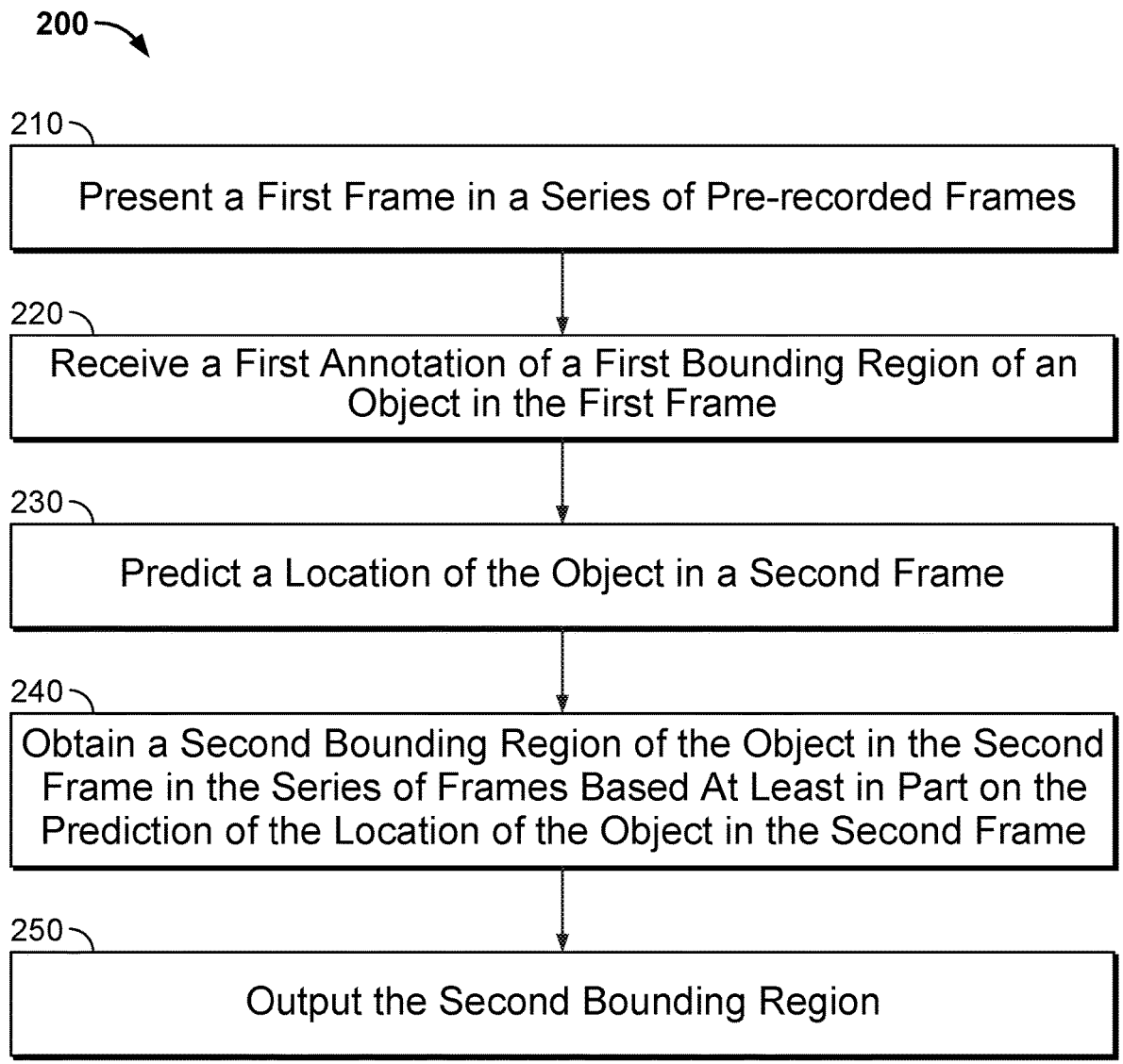
FIG. 2 is a flowchart of an embodiment of a method for annotation that can be performed by the exemplary system depicted in FIG. 1.

FIG. 2 is a flowchart of an embodiment of a method 200 for annotation (including video annotation) that can be performed by the exemplary system depicted in FIG. 1. As shown in FIG. 2, method 200 comprises presenting a first frame in a series of pre-recorded frames at 210 and receiving a first annotation of a first bounding region of an object in the first frame at 220. A location of the object in the second frame is predicted at 230 and a second bounding region of the object in a second frame in the series of frames is obtained based at least in part on the prediction of the location of the object in the second frame at 240. At 250, the second bounding region is output by the system.

In some embodiments, the method includes receiving a pre-recorded video and preprocessing the video to break it into a series of pre-recorded video frames. In some examples, the method includes displaying the first video frame in the series of pre-recorded video frames, with the first bounding region of the object in the first video frame, and the second bounding region of the object in the second video frame. In these examples, an interface (e.g., graphical user interface 104 of FIG. 1) is configured to display the first video frame, the first bounding region, and the second bounding region. An example of a display of the first video frame, the first bounding region, and the second bounding region is depicted and described with respect to FIGS. 3 and 4.

Figure 3:
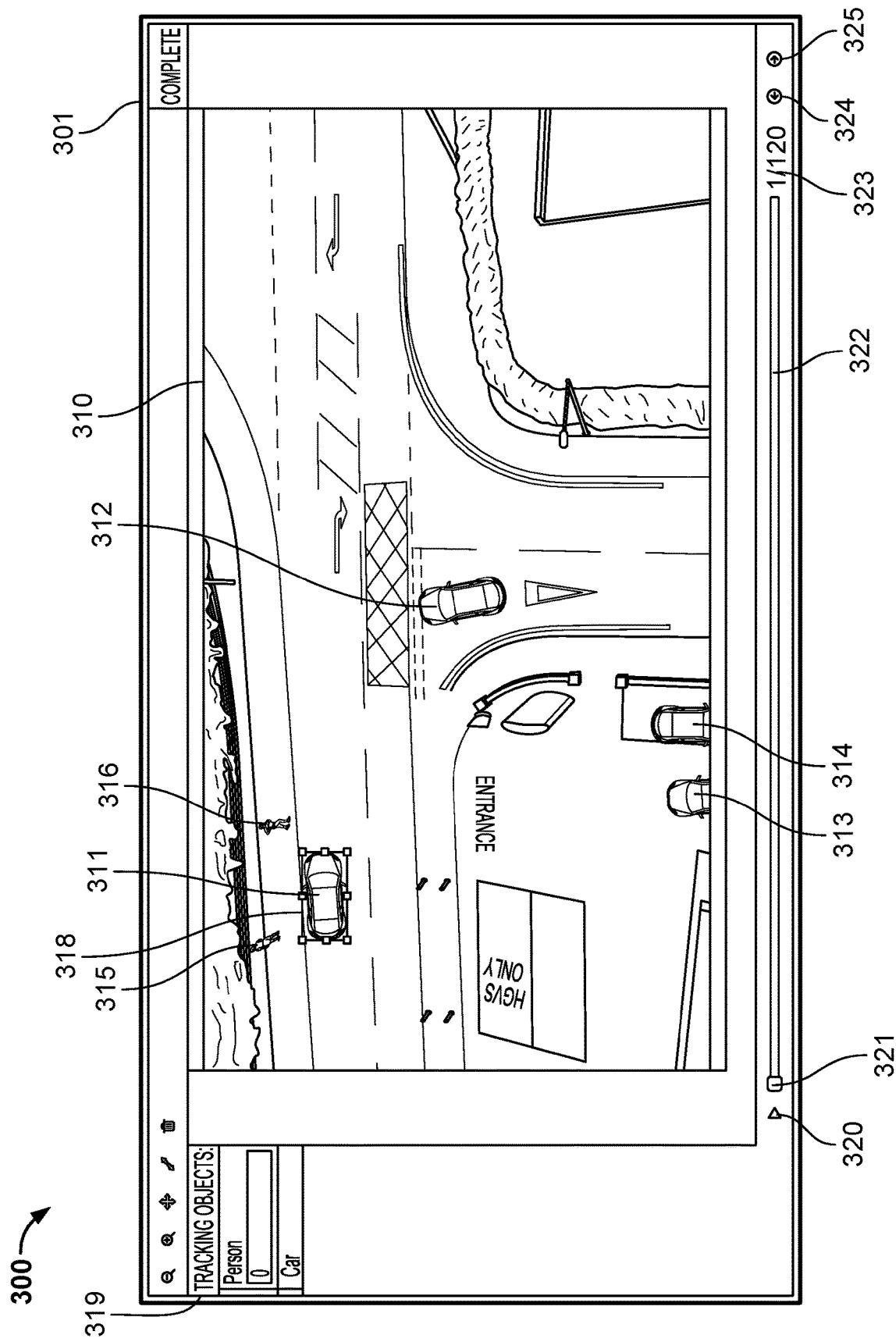
FIG. 3 is a screenshot of an exemplary display of a first video frame presented by an embodiment of a graphical user interface of a system for performing video annotation and video object tracking.

FIG. 3 is a screenshot 300 of an exemplary display 301 of a first video frame 310 presented by an embodiment of a graphical user interface of a system for performing video annotation and video object tracking. In the example shown, a video has been pre-processed by the system to obtain a series of pre-recorded video frames. A first video frame 310 in a series of pre-recorded video frames is presented on display 301. In this case, the first video frame 310 depicts a number of objects including cars (e.g., various cars shown at 311, 312, 313, and 314) and people, who in this case appear to be pedestrians (e.g., a person at 315 and another person at 316).

The exemplary interface depicted in screenshot 300 of FIG. 3 is configured to display a frame and to receive an annotation. In this case, the frame is a video frame and the annotation is a video annotation. In the example shown, an object desired to be tracked is selected as the car shown at 311, and a first annotation of a first bounding region 318 of an object in the first video frame (in this case, the car shown at 311) is received. For example, a first annotation can be a bounding region generated by creating or drawing a box or other shape around an object to be tracked. The bounding region defined by the first annotation can be associated with a set of coordinates on the frame. In some cases, the first annotation is input by a user (e.g., via an interface such as graphical user interface 104 of FIG. 1), while in other cases, the first annotation is machine-generated.

For example, a processor such as CPU 102 of FIG. 1 can be configured to determine the first annotation through the use of predictive models such as machine learning models. In some cases, a machine makes a prediction to determine the first annotation through the use of a deep neural network configured to output pixel coordinates of an object of interest. The machine makes a prediction by running each pixel of the image of interest (e.g., a frame) through a series of compute nodes that output a value based on the input pixel numerical value (e.g., red, green, blue numerical values). The machine is configured to execute specific functions on each node that are tuned through the process of machine learning, for example, through the process of back-propagation. With enough tuning through the use of training examples or training data, the machine can predict the location of the desired object to a high degree of accuracy comparable to that of a human.

In some embodiments, the deep neural network is a convolutional neural network that convolves pixel values and executes or performs node functions on the convolved pixel values. In some cases, a YOLD (You Only Look Once) framework for a convolutional neural network is used as the deep neural network for predicting the first annotation. Once a first annotation is received, the system can assign or specify a type or category of object associated with the first annotation (e.g., car or person).

In some embodiments, an annotation is received from a user who generates or inputs a bounding region around an object of interest (e.g., by creating or drawing a box around the object) in a frame of a video. The bounding region will then follow or track the object across multiple frames. In the example of FIG. 3, the bounding region 318 is a rectangular box that can be labeled by a category, like "car," and the label and box persist even if that object is no longer visible on a video frame (e.g., if the object of interest goes behind a large object such as a car going under a bridge, or if the object of interest leaves and re-enters the video frame). Here, objects that are tracked and labeled by a category (e.g., "person" or "car") are listed in a display element, which in this case is a left bar or column at 319 under a heading of "TRACKING OBJECTS." In some cases, including the example of FIG. 3, the box is an actual rectangular box with four sides, and in other cases it is a polygon with any number of sides. Other appropriate shapes can be used. In some embodiments, the disclosed method and system are used to perform not just object tracking, but also object segmentation tracking, wherein a pixel or group of pixels are tracked rather than an object of interest.

A series of video frames obtained from pre-processing the video is loaded to provide the video frames in a sequential order. A user can choose to start on any video frame in the series as a "first video frame" in which the user selects or identifies an object of interest to track. In particular, a user can play the video, step through the video frames, pause at any given video frame, and can annotate an object of interest to track by creating or drawing a bounding region (e.g., a box) around the object in the given video frame.

In FIG. 3, a series of 120 video frames has been loaded in a sequential order and a first video frame 310 is displayed to the user. A selection element (e.g., "play" button or icon) at 320 allows the user to play the video or step through the video frames. An indicator at 321 moves along a scroll bar 322 to indicate a sequential location of the currently displayed video frame with respect to the entire sequence of video frames in the video. In this case, because the first video frame 310 selected by the user happens to be the first video frame sequentially (i.e., video frame number 1) in the series of 120 video frames, the indicator at 321 is disposed at a far left position on the scroll bar, indicating that the displayed video frame is the first video frame in the series. As the user steps through the video frames in sequential order, the indicator at 321 moves from the left to the right of the scroll bar, wherein a position at the far right of the scroll bar indicates that the displayed video frame is the last video frame in the series.

In addition to the indicator at 321 and the scroll bar 322, a numerical indicator at 323 shows which video frame in the series of video frames is currently being displayed. In this case, the numerical indicator reads "1/120," which means that the video frame currently being displayed is the first video frame in a series of 120 video frames that have been loaded sequentially from a video that has been pre-processed. A selection element (e.g., the arrow button or icon) at 324 allows the user to step backward through a series of frames, including moving to the first video frame in the sequence, while a selection element (e.g., the arrow button or icon) at 325 allows the user to step forward through the series of frames, including moving to the last video frame in the sequence. In this example, the user can use a pointing device (e.g., pointing device 106 of FIG. 1) for interacting with the graphical user interface.

As shown in FIG. 3, the user can start with a video, play the video, pause at any given video frame, and select an object of interest (e.g., the car at 311) on the given video frame. Here, the user starts on a selected video frame (e.g., a first video frame) to identify objects of interest for the system to track. The user can then provide an annotation (e.g., an initial or first annotation) by creating or drawing a bounding region around the object 311, which in this case is the rectangular box shown at 318. Once a first annotation is received, the user can assign or specify a type or category of object associated with the first annotation (e.g., car or person). By allowing the user to annotate any given frame, the system provides the user with frame-level granularity as the user is annotating.

Figure 4:
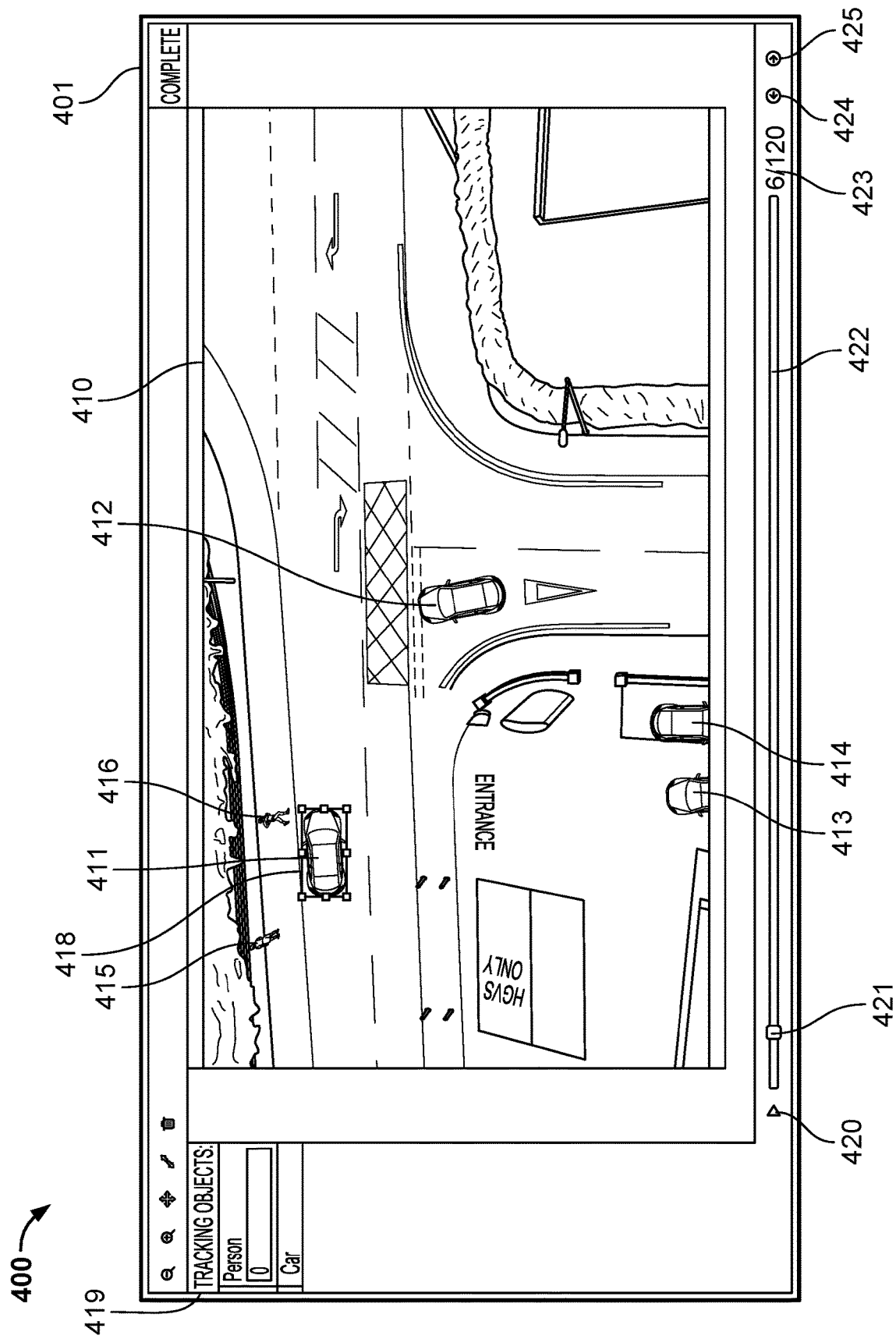
FIG. 4 is a screenshot of an exemplary display of a second or subsequent video frame presented by an embodiment of the graphical user interface shown in FIG. 3.

An HTML canvas with javascript is used on a front end of some embodiments to enable users to make markings, annotations, or draw boxes around objects of interest. In some instances, a graphical user interface is presented in a browser and a browser-based overlaying HTML element is used. In these cases, a browser-based implementation displays the video frames and an HTML canvas is overlaid over the video frames that are being displayed. The canvas is an HTML element that allows user interactions, enabling a user to input an annotation by drawing or painting a first image, element, box, or bounding region onto the canvas. In this manner, a user is able to interact by, for example, clicking and dragging a pointer to draw a box around an object in a video frame. An annotation or box received as an input to the system defines or specifies a set of coordinates on an image or video frame in a sequence or series of video frames. In some embodiments, information related to the object being tracked is sent to a server. The information sent to the server includes, for example, a sequence of video frames, an image number in the sequence (e.g., video frame number 6 out of a series of 120 video frames as shown in FIG. 4), and coordinates associated with an annotation or box around the object being tracked. In some embodiments, as an annotation is made or a box is drawn around an object, an object identifier or ID is associated with the annotation or box, and a post is sent to the server.

In some embodiments, in order to track an object of interest, the system assigns and maintains an object identifier or ID that is associated with an annotation of an object (e.g., a bounding region), which in this case is the box at 318, and predicts a trajectory of the object 311 as it moves, wherein the object's movement is captured in subsequent video frames. Note that the system is not limited to tracking a specific type of object. In particular, a person or an object can be annotated in any given frame and its motion predicted and tracked in subsequent video frames. Here, once an object such as the car at 311 has been annotated with a first bounding region such as the box at 318, the system tracks the car at 311 through a second or subsequent video frame. The system determines or provides a prediction of the object's motion by predicting a location of the object in the second or subsequent video frame. As shown in the following figure, the user can view a second or subsequent frame that shows the prediction (e.g., a second bounding region or box overlaid on the second or subsequent frame) of the tracked object on the same display as the first video frame (e.g., display 118 of FIG. 1).

FIG. 4 is a screenshot 400 of an exemplary display 401 of a second or subsequent video frame 410 presented by an embodiment of the graphical user interface shown in FIG. 3. As in FIG. 3, a video has been pre-processed by the system to obtain a series of pre-recorded video frames. In this case, a second or subsequent video frame 410 that follows the first video frame 310 of FIG. 3 in a series of pre-recorded video frames is presented on display 401. Here, because the first video frame 310 happened to be the first video frame sequentially (video frame number 1) in the series of 120 video frames, the second or subsequent video frame 410 is actually the sixth video frame sequentially (video frame number 6) in the series of 120 video frames. However, generally speaking, a "first video frame" can be chosen or selected as any frame in a series, with a "second video frame" or "subsequent video frame" being any frame that either follows or in some cases precedes the "first video frame" selected in the series. For example, a user can choose to view or analyze frames in reverse sequential order, in which case a second or subsequent video frame may be a video frame corresponding to a time that precedes or is prior to the first video frame that is selected and viewed.

In this case, as described above, the second or subsequent video frame 410 is the sixth video frame in the series of 120 video frames. Here, the second video frame 410 depicts the same objects shown in the previous video frame, which in this case is the first video frame 310. In particular, the cars, previously shown at 311, 312, 313, and 314 in the first video frame 310 of FIG. 3, are now shown at 411, 412, 413, and 414 respectively in the second video frame 410 of FIG. 4. Similarly, two pedestrians, previously shown at 315 and 316 in the first video frame 310 of FIG. 3, are now shown at 415 and 416 respectively in the second video frame 410 of FIG. 4.

A comparison of the first video frame 310 and the second video frame 410 reveals that certain objects are in motion. Here we see that an object's location in the first video frame is different from the object's location in the second video frame. In particular, the car at 311 in the first video frame 310 has moved to a different location as shown at 411 in the second video frame 410. As described above with respect to FIG. 3, the car at 311 has been annotated with a first annotation of a first bounding region at 318. Once the first annotation is received, the annotated object can be assigned an object type or category associated with the first annotation (e.g., car or person). The bounding region follows or tracks the object across multiple frames. Here, the bounding region 318 is a rectangular box labeled by a category "car" in FIG. 3. As shown in FIG. 4, the label and box persist and would still persist even if the object is no longer visible in the currently viewed frame. In the example shown, objects that are tracked and labeled by a category (e.g., "person" or "car") are listed in a left bar or column at 419 under a heading of "TRACKING OBJECTS."

As in FIG. 3, the graphical user interface shown in the screenshot 400 of FIG. 4 includes a selection element (e.g., "play" button or icon) at 420, allowing the user to play the video or step through the video frames. An indicator at 421 moves along a scroll bar 422 to indicate a sequential location of the currently displayed video frame with respect to the entire sequence of video frames in the video. Note that the indicator 421 has moved to a position along the scroll bar 422 to a position that is to the right of the indicator 321 shown on scroll bar 322, which indicates that the user has stepped through to view a subsequent video frame in FIG. 4 (in this case, the sixth video frame sequentially in the series of 120 video frames) as compared with the previously viewed video frame (in this case, the first video frame sequentially in the series of 120 video frames) shown in FIG. 3.

In addition, a numerical indicator at 423 shows which video frame in the series of video frames is currently being displayed. In this case, the numerical indicator reads "6/120," which indicates that the video frame currently being displayed is the sixth video frame in a sequence or series of 120 video frames that have been loaded sequentially from a video that has been pre-processed and broken into a series of video frames. A selection element (e.g., the arrow button or icon) at 424 allows the user to step backward through a series of frames, including moving to the first video frame in the sequence, while a selection element (e.g., the arrow button or icon) at 425 allows the user to step forward through the series of frames, including moving to the last video frame in the sequence. In this example, the user can use a pointing device (e.g., pointing device 106 of FIG. 1) for interacting with the graphical user interface.

As in the embodiment shown in FIG. 3, in the example of FIG. 4, the user can start with a video, play the video, pause at any given video frame, and select an object of interest (e.g., the car at 411) on the given video frame. In this case, the car at 311 has been annotated with a first annotation of a first bounding region at 318, which is tracked by the system. The first annotation has also been assigned an object type or category, in this case "car." The system predicts a location of the object or the object's location in the second video frame, obtains a second bounding region of the object in a subsequent video frame in the series of video frames based at least in part on the prediction of the location of the object in the second video frame, and outputs the second bounding region. In the example shown, the system predicts a location of the object (in this case, the car shown at 311) in the second video frame 410 and obtains a second bounding region 418 of the object in the series of video frames (in this case, the object is the same car, which is shown at 411) based at least in part on the prediction of the location of the object in the second video frame. The system then outputs the second bounding region 418, which can be in the form of the box shown on the display 401 or in the form of coordinates that correspond to the second bounding region 418 on the second video frame 410. The second bounding region 418 is associated with the same object identifier or ID as the first bounding region 318, providing an ability to maintain a unique object identifier that tracks the same object over a series of video frames.

Thus, in contrast to frame-level tracking, wherein a video frame is broken down into images and each image is annotated separately, object-level tracking provides an ability to maintain a notion of the same object (e.g., by associating that object with a unique object identifier or ID) and track that object through a series of video frames. Object-level tracking is achieved in this case by assigning and maintaining an identifier or ID of an object across video frames even as the object moves and/or comes in and out of view in any given video frame.

For example, returning to FIGS. 3 and 4, the car shown at 311 in FIG. 3 is the same car at 411 in FIG. 4 and the system is actually maintaining an object identifier or ID for the car being tracked in the two video frames 310 and 410. In some embodiments, an object identifier or ID is created on the user side (e.g., on a client and/or a browser). Whenever a user inputs an annotation, for example, by drawing a new box around a new object the user desires to track, the system displays and adds a representation of the object (e.g., by adding a representation of the object to the left bar shown at 319 and 419 respectively). As a result, if the object being tracked gets occluded or moves out of view in any given video frame, the system still maintains the object's identifier or ID and knowledge of where the object is and that it still exists.

More specifically, an object being tracked is annotated as described herein by applying a first annotation of a first bounding region of the object and assigning or designating an identifier or ID associated with the first bounding region. In the event that the object disappears from view in a subsequent frame, the first bounding region associated with the object's identifier or ID is recalled and placed around the object where it is currently located in the subsequent frame so that the system can continue tracking the object. For example, the system can determine or make a prediction of a location of the object in a subsequent video frame regardless of whether the object is visible in the subsequent video frame, and the object's identifier or ID can be recalled and placed around the predicted location of the object even in the case where the object disappears from view. The object being tracked can disappear from view if it moves out of the video frame or moves behind and is hidden by another object, such as when a car being tracked goes under a bridge. In video frames where the object being tracked is not visible, the bounding region is also not visible, but the object's identifier or ID is maintained by the system and can be recalled once the object becomes visible again.

In some cases, a user can indicate to the system that the object being tracked has moved off screen or out of a given frame completely. In these cases, if the object has been identified as being off screen, the system will not attempt to track the object with a bounding region, but the object identifier or ID persists and the system will maintain a prediction of a location of the object. In some instances, the system determines or provides a confidence score of the prediction (e.g., a measure of confidence associated with an accuracy of the prediction of a location of an object in a second or subsequent video frame). An object that has moved off screen or out of a given frame can be assigned a lower confidence score associated with its location. In other cases, the system is configured to detect when an object has disappeared from view (e.g., is hidden or obstructed or has moved off screen or out of a given frame) and provides a flag or indicator in response to detecting that an object has disappeared from view. For example, the system automatically removes the bounding region or box in a second or subsequent screen and provides an indication (e.g., on the left bar or column shown at 419 of FIG. 4 under a heading of "TRACKING OBJECTS") that the object being tracked is no longer visible. The user can then be prompted to confirm whether the object is visible or not.

In some embodiments, data collected and returned or output by the system is used to train machine learning models that learn not only what the object being tracked looks like (e.g., a car or a person) but also the object's motion over time. In some cases, on any given frame, the output of the system includes a predicted bounding region or box (e.g., a second bounding region in a given video frame representing a prediction of a location of the object being tracked in the given video frame), the coordinates of the predicted bounding region (e.g., a second set of coordinates associated with or specifying the second bounding region), object labels or tags indicating a type or category of object (e.g., person or car) for the object being tracked in the given frame, and an indicator or flag for whether or not the object being tracked is visible in the given frame.

In some examples, predicting a location of the object in the second video frame includes applying a tracker. Using a tracking algorithm, a tracker can be applied to keep track of an object in a video sequence. A tracking algorithm can be initialized with a frame of a video sequence and a bounding box to indicate the location of the object to be tracked. The tracking algorithm outputs a bounding box for all subsequent frames.

For example, GOTURN (Generic Object Tracking Using Regression Networks) is a Deep Learning-based object tracker trained using a pair of cropped frames from thousands of videos. In a first frame (also referred to as the previous frame), the location of the object is known, and the frame is cropped to two times the size of the bounding box around the object. The object in the first cropped frame is always centered. The location of the object in the second frame (also referred to as the current frame) needs to be predicted. The bounding box used to crop the first frame is also used to crop the second frame. Because the object might have moved, the object is not centered in the second frame.

A Convolutional Neural Network (CNN) is trained to predict the location of the bounding box in the second frame. The CNN takes two cropped frames as input. The previous frame is centered and the goal is to find the bounding box for the current frame (i.e., the location of the object in the second frame).

Both frames pass through a bank of convolutional layers. The outputs of these convolutional layers are concatenated into a single vector. This vector is input to three fully connected layers. The last fully connected layer is finally connected to the output layer containing four nodes representing the top and bottom points of the bounding box.

Figure 5:
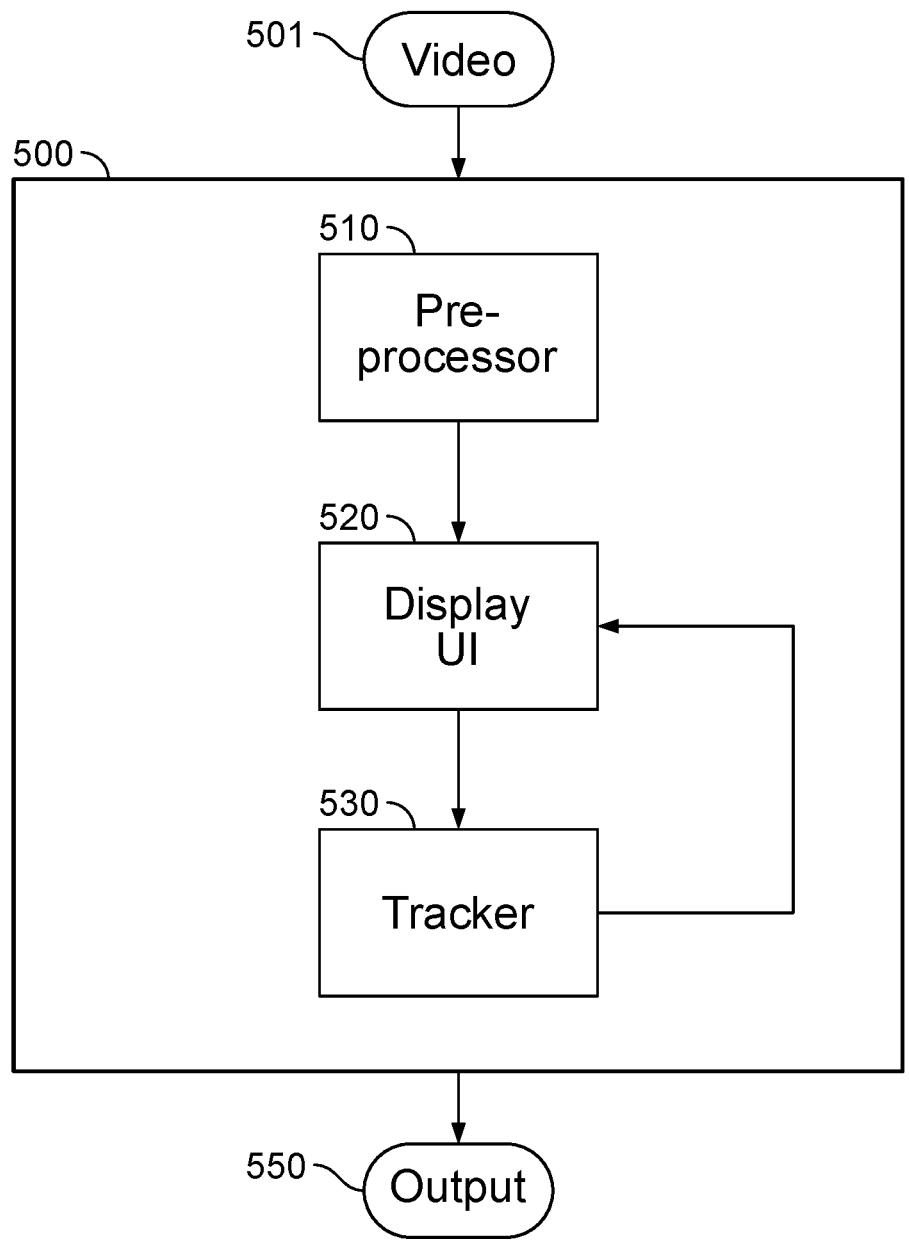
FIG. 5 is a block diagram of a system used in some embodiments to perform video annotation and video object tracking that includes a tracker.

As an example, FIG. 5 is a block diagram of a system used in some embodiments to perform video annotation and video object tracking that includes a tracker.

As shown in FIG. 5, the system 500 receives a video 501, which is pre-processed by the system (e.g., by Pre-processor 510) to break the video up into a series of video frames. The video frames obtained from pre-processing the video at 510 are loaded in a sequential order and displayed on a display of a graphical user interface (e.g., Display UI 520). Display UI 520 is configured to display a video frame and to receive a video annotation. In particular, a first video frame in the series of video frames is presented on Display UI 520. A first annotation of a first bounding region of an object in the first video frame (whether a user-inputted annotation or a machine-generated annotation) is received by the system 500.

In some embodiments, the first annotation defines or specifies a first set of coordinates. The first set of coordinates associated with the first annotation of the first bounding region is received by a tracker (e.g., Tracker 530). Based at least in part on the received coordinates, the tracker predicts a second set of coordinates associated with a location of the object in a second or subsequent video frame, the object having been annotated by the first bounding region in the first video frame.

In some cases, Tracker 530 predicts a second set of coordinates on the second video frame based on comparing the first video frame to the second video frame. For instance, in some examples, a comparison of the first video frame and the second video frame is based on image information extracted from the first video frame and the second video frame. In other examples, the system 500 predicts the location of the object in the second video frame by comparing a cropped region of the object in the first video frame to a cropped region of the object in the second video frame and determining a second set of coordinates of the object's location in the second video frame based on a location corresponding to the cropped region of the object in the second video frame that best matches the cropped region of the object in the first video frame. In other words, by comparing a cropped region from the second frame to the initial cropped region from the location of the object in the first frame, the tracker can select the most closely matching region in the second frame and return the location or coordinates of that region in the second frame.

Additionally, the system 500 automatically tracks an object using new architectures of Deep Learning technologies that go beyond typical Computer Vision algorithms like Convolutional Neural Networks on individual frames, to also encode the changes in pixel values between video frames, the content of a bounding region around an object, and the content of bounding regions around other objects in the same image or video frame and dataset. Accordingly, in some cases, the system 500 predicts a location of the object in a second or subsequent video frame in response to or based on at least one of: encoding changes in pixel values between video frames, the content of a bounding region around an object, and the content of bounding regions around other objects in the same image or video frame and dataset. For example, changes in pixel values between video frames or changes in content of bounding regions around an object between two frames can be used as input to a deep learning model trained to distinguish between these changes in order to make a prediction with respect to the location of the object being tracked.

In some examples, an output from Tracker 530 is compared with an initial input or annotation (e.g., a first annotation of a first bounding region in a first video frame or a cropped version of an object being annotated). An output from Tracker 530 includes an image of an object (e.g., a cropped image), a bounding region, or a set of coordinates that can be used to specify or designate an image or bounding region. In at least one example described above, a tracker output of Tracker 530 comprises a second set of coordinates associated with a location of the object in a second or subsequent video frame, the object having been annotated by the first bounding region in the first video frame.

In some instances, Tracker 530 also provides a confidence score of its prediction. In this case, the closer the match between an initial or first annotation or other benchmark representing the object being tracked and the output of Tracker 530, the more accurate the tracker's prediction of the location of the object in a second or subsequent video frame, and the higher the confidence score associated with the tracker's prediction. Thus, the confidence score represents a measure of the tracker's confidence or an estimated probability that the tracker's prediction or predicted region is correct.

There are many different ways that images can be compared for similarity. One approach is to take the numerical difference of every pixel value (e.g., an RGB pixel value) at each given location such as the (x,y) coordinates, sum all the differences for all pixels, and divide by the total number of pixels. In this case, the higher the value, the more different the images are. Similarly, the lower the value, the more similar the two images are. Note that this is but one approach for comparing two images and the disclosed technique is not limited to a single approach but includes applying other methods, including potentially more complex methods of comparing two images or cropped regions of images.

Moreover, in some embodiments, the system 500 sets a confidence threshold wherein, if a confidence score received from a tracker associated with the tracker's prediction is below the confidence threshold, the system provides an indication or an alert to the user that the tracker's prediction may be inaccurate. The indication or alert can be implemented in various ways and take different forms. For example, the second bounding region or box corresponding to the tracker's prediction of the location of the object in the second or subsequent video frame may be shown in a different color or highlighted, or the object identifier or ID associated with the object being tracked in the prediction may be highlighted on the display. Additionally, in some instances, the confidence threshold is set by the user while in other cases, it is determined by the system. By providing a confidence score for each prediction (e.g., each predicted bounding region), the system 500 increases efficiency by focusing a user's attention and efforts on areas of the video where there may be a tracking error rather than having the user check each prediction or make each annotation manually.

In this example, by applying a tracker (e.g., Tracker 530), the system 500 obtains a second bounding region of the object in the second or subsequent video frame in the series of video frames based at least in part on the prediction of the location of the object in the second video frame. Display UI 520 is configured to display the first video frame, the first bounding region, and the second bounding region. As shown in FIG. 5, an output of Tracker 530 is received as an input by Display UI 520. In this manner, Display UI 520 receives a prediction of the location of the object in the second video frame from Tracker 530 (e.g., a second set of coordinates on the second video frame), and in response to or based on the input received from Tracker 530, displays the second bounding region on the second video frame. An example of such a display is provided by FIGS. 3 and 4. In particular, displays of a first video frame, a first bounding region, and a second bounding region are depicted and described with respect to FIGS. 3 and 4.

At 550, the system outputs the second bounding region, which can be in the form of the box shown on the display 401 of FIG. 4 or in the form of a second set of coordinates that correspond to the second bounding region on the second video frame as returned by Tracker 530. Additionally, in some embodiments, data collected and returned or output by the system at 550 is used to train machine learning models that learn not only what the object being tracked looks like (e.g., a car or a person) but also the object's motion over time.

In some instances, the data output by the system is used to train or tune a machine learning model by taking the output data (e.g., in the form of pixel coordinates (x,y) like a pixel grid), and using the output data as a reference for an algorithm (e.g., a convolutional neural network) to tune function parameters of the model. One example of a convolutional neural network (CNN) has a series of linear functions that all compute outputs based on inputs such as RGB pixel values and constant parameters that are tuned. In some cases, the pixel values and parameters are tuned by performing a back-propagation process. This back-propagation process attempts to minimize an error function by adjusting constants or weights on a series of functions whose aggregate output is compared to a known value, which in this case, is the output of the system. The comparison is then used to calculate the error being minimized.

In some cases, on any given frame, the output of the system at 550 includes a predicted bounding region or box (e.g., a second bounding region in a given video frame representing a prediction of a location of the object being tracked in the given video frame), the coordinates of the predicted bounding region (e.g., a second set of coordinates associated with or specifying the second bounding region), object labels or tags indicating a type or category of object (e.g., person or car) for the object being tracked in the given frame, and an indicator or flag for whether or not the object being tracked is visible in the given frame.

The components described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the components can be embodied by a form of software products which can be stored in a non-volatile storage medium (such as optical disk, flash storage device, mobile hard disk, etc.), including a number of instructions for making a computer device (such as personal computers, servers, network equipment, etc.) implement the methods described in the embodiments of the present application. The components may be implemented on a single device or distributed across multiple devices. The functions of the components may be merged into one another or further split into multiple sub-components.

Figure 6:
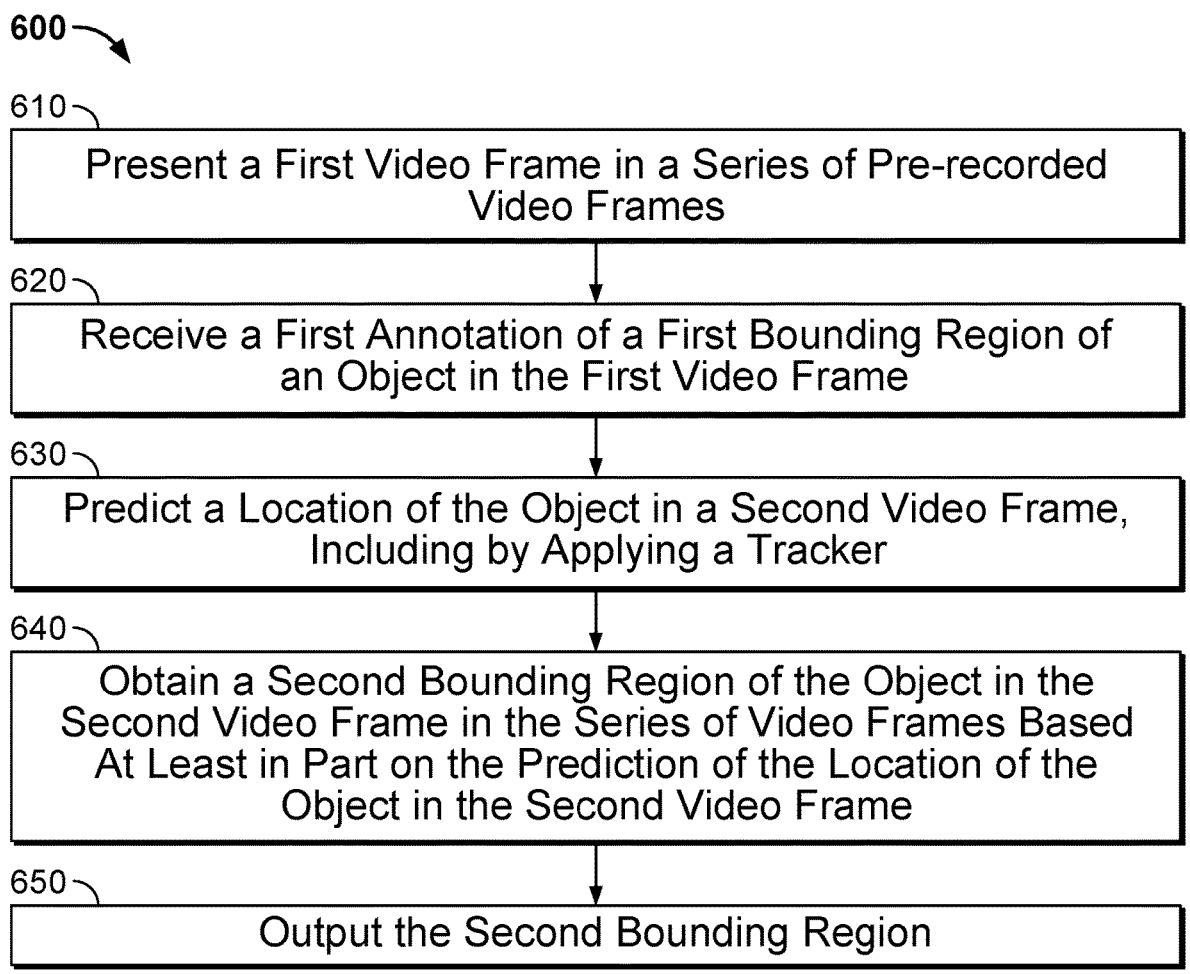
FIG. 6 is a flowchart of an embodiment of a video annotation method that can be performed by the exemplary system depicted in FIG. 5 that includes a tracker.

FIG. 6 is a flowchart of an embodiment of a video annotation method 600 that can be performed by the exemplary system depicted in FIG. 5 that includes a tracker. As shown in FIG. 6, method 600 comprises presenting a first video frame in a series of pre-recorded video frames at 610 and receiving a first annotation of a first bounding region of an object in the first video frame at 620. At 630, the method predicts a location of the object in the second video frame, including by applying a tracker. At 640, a second bounding region of the object in a second video frame in the series of video frames is obtained based at least in part on the prediction of the location of the object in the second video frame. At 650, the second bounding region is output by the system.

Additionally, in some embodiments, along with the second bounding region, the system also outputs data used to train machine learning models that learn not only what the object being tracked looks like (e.g., a car or a person) but also the object's motion over time. In some cases, on any given frame, in addition to outputting a predicted bounding region or box at 650 (e.g., a second bounding region in a given video frame representing a prediction of a location of the object being tracked in the given video frame), the system also outputs the coordinates of the predicted bounding region (e.g., a second set of coordinates associated with or specifying the second bounding region), object labels or tags indicating a type or category of object (e.g., person or car) for the object being tracked in the given frame, and an indicator or flag for whether or not the object being tracked is visible in the given frame.

In some embodiments, the tracker comprises a plurality of trackers. As an example, FIG. 7 is a block diagram of a system used in some embodiments to perform video annotation and video object tracking that includes a plurality of trackers.

Figure 7:
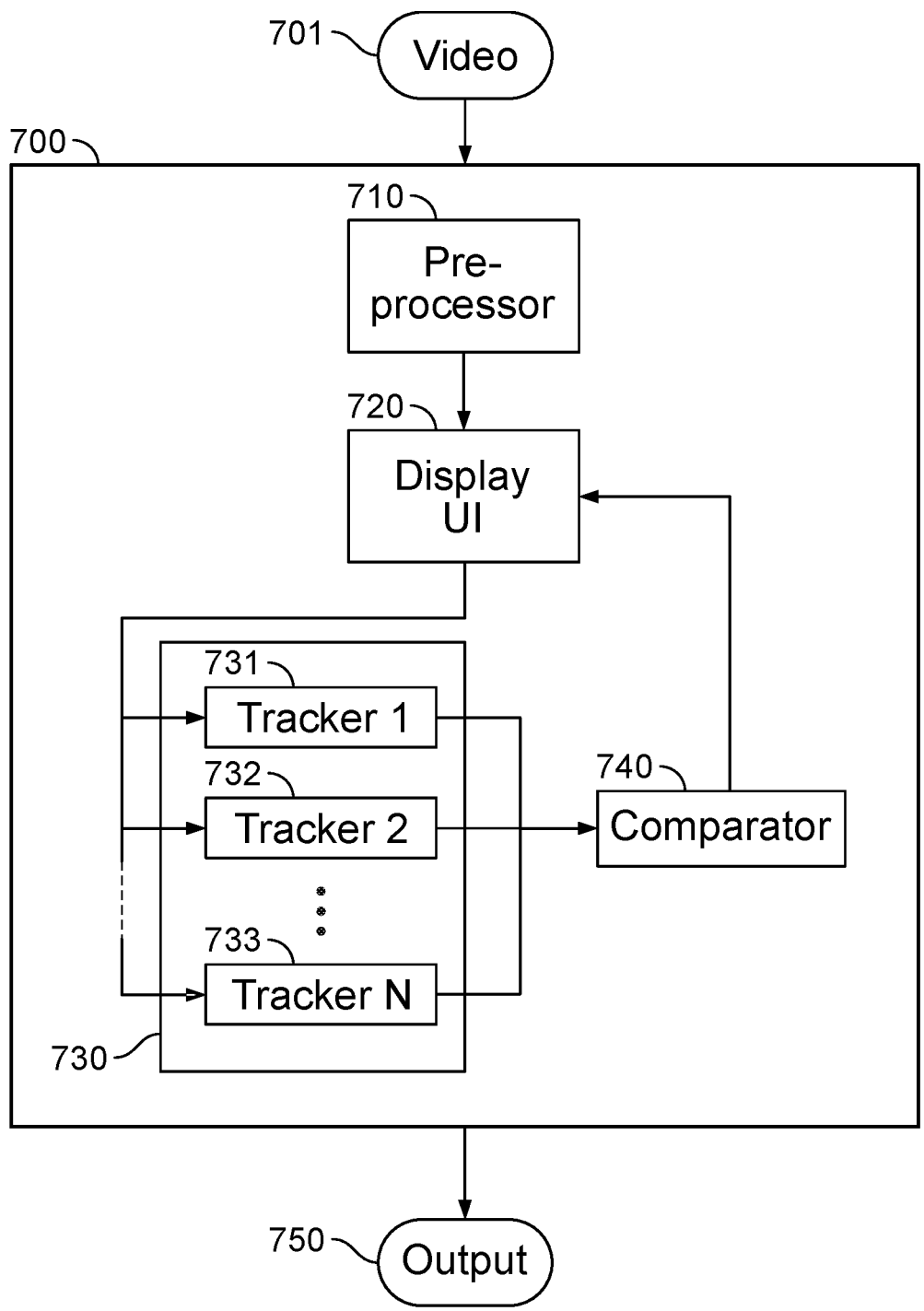
FIG. 7 is a block diagram of a system used in some embodiments to perform video annotation and video object tracking that includes a plurality of trackers.

As shown in FIG. 7, the system 700 receives a video 701, which is pre-processed by the system (e.g., by Pre-processor 710) to break the video up into a series of video frames. The video frames obtained from pre-processing the video at 710 are loaded in sequential order and displayed on a display of a graphical user interface (e.g., Display UI 720). Display UI 720 is configured to display a video frame and to receive a video annotation. In particular, a first video frame in the series of video frames is presented on Display UI 720. A first annotation of a first bounding region of an object in the first video frame (whether a user-inputted annotation or a machine-generated annotation) is received by the system.

In some embodiments, the first annotation defines or specifies a first set of coordinates. The first set of coordinates associated with the first annotation of the first bounding region is received by a tracker (e.g., Tracker 730). In the example shown, Tracker 730 comprises a plurality of trackers (e.g., Tracker 1, Tracker 2, . . . Tracker N) at 731, 732, and 733 respectively. Based at least in part on the received coordinates, each of the trackers in the plurality of trackers predicts a second set of coordinates associated with a location of the object in a second or subsequent video frame, the object having been annotated by the first bounding region in the first video frame.

In some cases, each tracker in the plurality of trackers predicts a second set of coordinates on the second video frame based on comparing the first video frame to the second video frame. For instance, in some examples, a comparison of the first video frame and the second video frame is based on image information extracted from the first video frame and the second video frame. In other examples, as described with respect to the following figures, each tracker in the plurality of trackers predicts the location of the object in the second video frame by comparing a cropped region of the object in the first video frame to a cropped region of the object in the second video frame.

Figure 8:
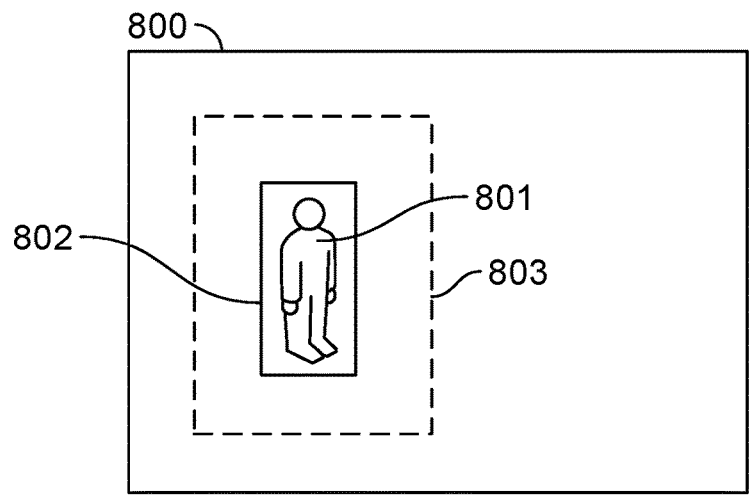
FIG. 8 illustrates an example of a first video frame presented by an embodiment of a graphical user interface of a system for performing video annotation and video object tracking.

FIG. 8 illustrates an example of a first video frame 800 presented by an embodiment of a graphical user interface of a system for performing video annotation and video object tracking. In particular, the example in FIG. 8 depicts a first bounding region 802 of an object 801 in the first video frame 800. In some cases, a first cropped region in the first video frame 800 is determined or defined by the first bounding region 802. Alternatively, because the first bounding region 802 is populated by the object 801, a buffer can be added and cropped to define a second cropped region 803 around the first bounding region 802. Thus, a tracker can use either a first cropped region defined by the first bounding region 802 or a second cropped region 803 to determine a cropped region in the second video frame, as shown in FIG. 9.

Figure 9:
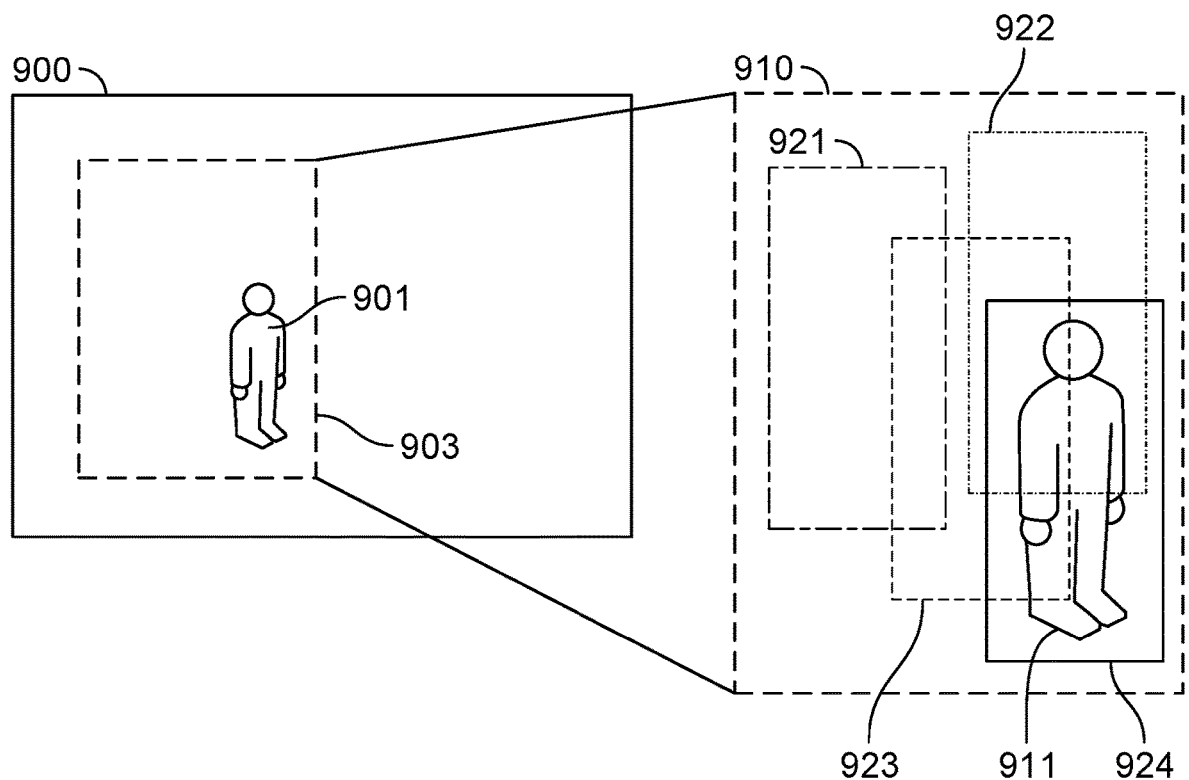
FIG. 9 illustrates an example of a second video frame presented by an embodiment of a graphical user interface of a system for performing video annotation and video object tracking.

FIG. 9 illustrates an example of a second video frame 900 presented by an embodiment of a graphical user interface of a system for performing video annotation and video object tracking. Note that the object (shown in the first video frame at 801 in FIG. 8) has moved in the second video frame 900 relative to its location in the first video frame and is shown as object 901. Continuing the example described with respect to FIG. 8, a cropped region in the second video frame 900 can be determined by taking the same coordinates of either the first cropped region defined by the first bounding region 802 or the second cropped region 803 in the first video frame 800 of FIG. 8.

As the example of FIG. 9 shows, in this case the tracker has determined a cropped region 903 by taking the same coordinates of the second cropped region 803 in the first video frame 800 of FIG. 8. Zooming in on the cropped region 903 results in a blown up view of the cropped region at 910 containing a blown up view of the object at 911. A bounding region is scanned in various locations (as shown at 921, 922, 923, and 924) within the cropped region shown at

910. Each scan of the bounding region (as shown at 921, 922, 923, and 924) is compared to the first bounding region 802 of the object 801 in the first video frame 800, and the most similar of the various scans is returned as the prediction for the second bounding region. In this case, the tracker determines that the scan of the bounding region at 924 is most similar to the first bounding region 802 and returns the scan 924 as the prediction for the second bounding region.

Returning to FIG. 7, the system 700 automatically tracks an object using new architectures of Deep Learning technologies that go beyond typical Computer Vision algorithms such as Convolutional Neural Networks on individual frames, to also encode the changes in pixel values between video frames, the content of a box around an object, and the content of boxes around other objects in the same image or video frame and dataset. Accordingly, in some cases, the system 700 predicts a location of the object in a second or subsequent video frame in response to or based on at least one of: encoding changes in pixel values between video frames, the content of a bounding region around an object, and the content of bounding regions around other objects in the same image or video frame and dataset.

In particular, by using the pixel information in a first bounding region of a first frame, a second bounding region in a subsequent frame can be predicted by finding the most similar region in the second frame that most closely matches the first bounding region. Similarity can be determined in a number of ways. For example, a first average pixel value is determined by taking the average value of pixels in the first bounding region of the first frame. This first average pixel value over the first bounding region is compared to various average pixel values taken over different potential bounding regions in the second frame, wherein each of the average pixel values is determined by taking the average value of pixels in each of a set of potential bounding regions in the second frame. The second bounding region is selected as the bounding region in the set of potential bounding regions in the second frame that yields an average pixel value that is closest to the first average pixel value over the first bounding region in the first frame.

In some cases, determining a location of an object or a bounding region may also include using a combination of linear interpolation and tracking. More specifically, the tracker can be configured to track between two non-consecutive frames and the intermediate frames can be filled in by linearly interpolating the coordinates between the first frame and the nth frame, where the prediction was made.

As mentioned above, in the example depicted in FIG. 7, the system 700 predicts the location of the object in the second video frame in response to or based on applying a plurality of trackers (e.g., at 731, 732, and 733). In these embodiments, the prediction is based at least in part on selecting an output from one of the plurality of trackers. For example, each output from each of the plurality of trackers at 731, 732, and 733 is compared with an initial input or annotation (e.g., a first annotation of a first bounding region in a first video frame or a cropped version of an object being annotated). An output from a tracker includes an image of an object (e.g., a cropped image), a bounding region, or a set of coordinates that can be used to specify or designate an image or bounding region. In at least one example described above, a tracker output comprises a second set of coordinates associated with a location of the object in a second or subsequent video frame, the object having been annotated by the first bounding region in the first video frame.

In some embodiments, the system 700 determines a similarity metric in response to or based at least in part on comparing each output from each of the plurality of trackers with an initial input or annotation or with some other benchmark. For example, the system 700 compares a tracker's output to an initial input or other benchmark and returns or outputs a similarity metric.

A benchmark can be an image or set of images representing an object desired to be tracked. The image or set of images can be collected by a user who determines that the collected image or set of images represents a ground truth for the object desired to be tracked. In some embodiments, a library of previously saved images is used to provide a benchmark image for comparing the output or predictions from each tracker.

A similarity metric indicates or represents a similarity between the two images being compared. For example, the similarity metric can correspond to a difference between the tracker's output and the initial input or benchmark—the smaller the difference, the higher the degree of similarity. The similarity metric can be a number on a scale, a percentage, or any other value that indicates a similarity between two images.

In some examples, the images used in the comparison are cropped versions of an object. For example, a first annotation of a first bounding region of an object in a first video frame generates an image of the object which is cropped before being compared. Similarly, a set of coordinates output from a tracker that predicts a location of an object in a subsequent video frame generates an image of the object in the subsequent video frame which is cropped before being compared. Finally, images of objects are cropped before being saved as benchmarks for comparison in the library.

In the example of FIG. 7, Comparator 740 compares the output of each tracker in the plurality of trackers to an initial input or other benchmark and determines a similarity metric (e.g., a number) that indicates or represents the similarity between the elements (e.g., images) being compared. In this example, Comparator 740 determines a similarity metric for each output of each tracker in the plurality of trackers. Comparator 740 then selects the tracker output determined to be most similar to the initial input or benchmark. Comparator 740 returns the selected tracker output as the prediction of the location of the object in the second or subsequent video frame. The selected tracker output, which in this case is the output of Comparator 740, is used by the system 700 to obtain a second bounding region of the object in the second or subsequent video frame. The selected tracker output is also an output of the system at 750 that is used in some embodiments to train machine learning models that learn not only what the object being tracked looks like (e.g., a car or a person) but also the object's motion over time.

At 750, the system 700 outputs the second bounding region, which can be in the form of the box shown on the display 401 of FIG. 4 or in the form of a second set of coordinates that correspond to the second bounding region on the second video frame as returned by Comparator 740. In some cases, on any given frame, the output of the system at 750 includes a predicted bounding region or box (e.g., a second bounding region in a given video frame representing a prediction of a location of the object being tracked in the given video frame), the coordinates of the predicted bounding region (e.g., a second set of coordinates associated with or specifying the second bounding region), object labels or tags indicating a type or category of object (e.g., person or car) for the object being tracked in the given frame, and an indicator or flag for whether or not the object being tracked is visible in the given frame.

In some cases, each tracker in the plurality of trackers also provides a confidence score of the prediction. In this case, the closer the match between the initial annotation or other benchmark representing the object being tracked and the output of a particular tracker, the more accurate the tracker's prediction of the location of the object in a second or subsequent video frame, and the higher the confidence score associated with the tracker's prediction.

In some embodiments, the system 700 sets a confidence threshold wherein, if a confidence score received from a tracker associated with the tracker's prediction is below the confidence threshold, the system 700 provides an indication or an alert to the user that the tracker's prediction may be inaccurate. The indication or alert can be implemented in various ways and take different forms. For example, the second bounding region or box corresponding to the tracker's prediction of the location of the object in the second or subsequent video frame may be shown in a different color or highlighted, or the object identifier or ID associated with the object being tracked in the prediction may be highlighted on the display. Additionally, in some instances, the confidence threshold is set by the user while in other cases, it is determined by the system. By providing a confidence score for each prediction (e.g., each predicted bounding region), the system 700 increases efficiency by focusing a user's attention and efforts on areas of the video where there may be a tracking error rather than having the user check each prediction or make each annotation manually.

Figure 10:
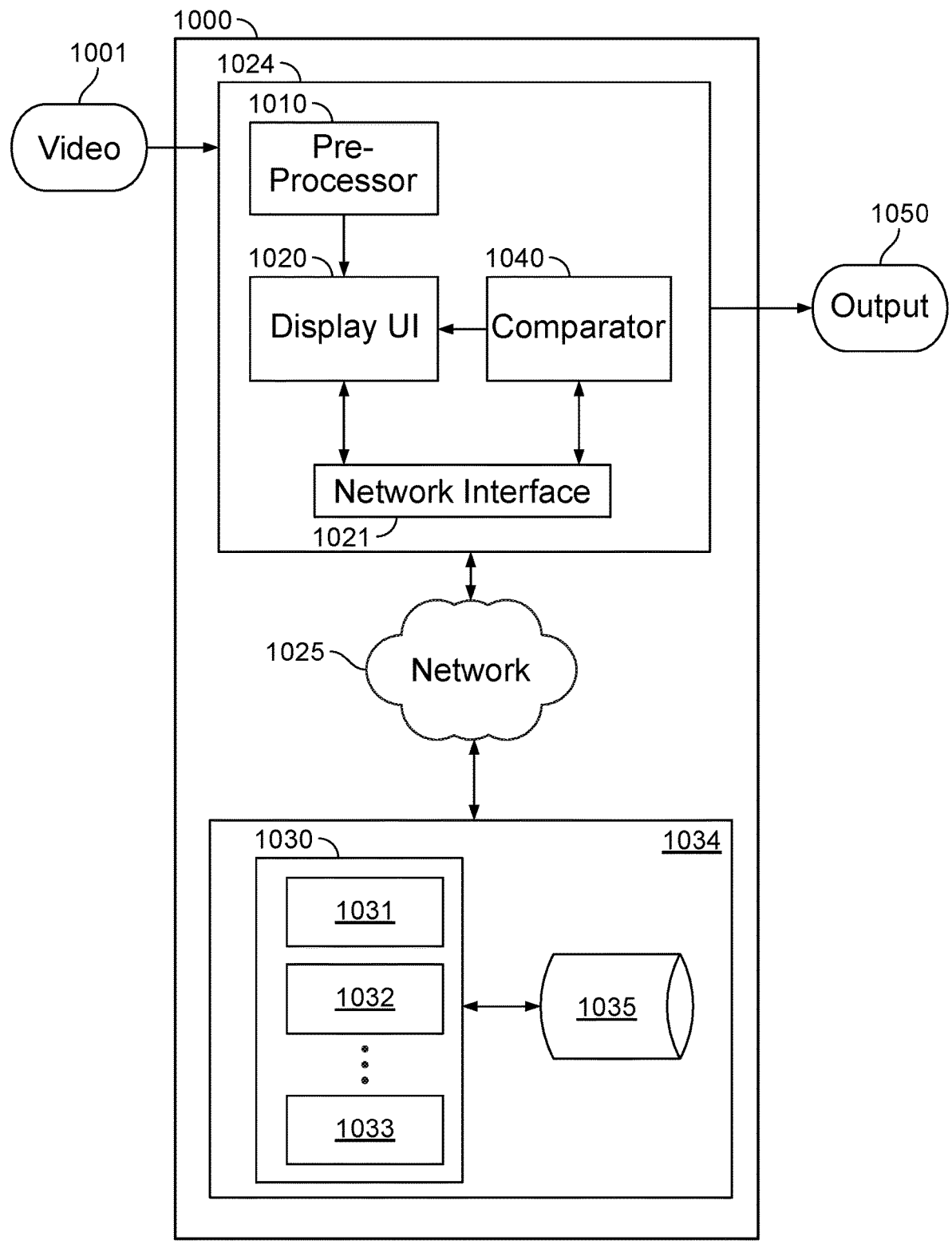
FIG. 10 depicts a block diagram of a system used in some embodiments to perform video annotation and video object tracking configured to perform across a network.

The technique disclosed herein can be implemented as a standalone system or a browser-based, online system comprising a client in communication with a remote server via a network. In particular, method embodiments of the disclosed technique may execute solely upon CPU 102 of FIG. 1, or may be performed across a network such as the Internet, intranet networks, or local area networks, in conjunction with a remote CPU that shares a portion of the processing. FIG. 10 depicts a block diagram of a system used in some embodiments to perform video annotation and video object tracking configured to perform across a network.

As shown in FIG. 10, system 1000 receives a video 1001, which is pre-processed by the system (e.g., by Pre-processor 1010) on a client 1024 to break the video up into a series of video frames. The video frames obtained from pre-processing the video at 1010 are loaded in a sequential order and displayed on a display of a graphical user interface (e.g., Display UI 1020). Display UI 1020 is configured to display a video frame and to receive a video annotation. In particular, a first video frame in the series of video frames is presented on Display UI 1020. A first annotation of a first bounding region of an object in the first video frame (whether a user-inputted annotation or a machine-generated annotation) is received by the system 1000.

An HTML canvas with javascript is used on a front end Display UI 1020 to enable users to make markings, annotations, or draw boxes around objects of interest. The <canvas> </canvas> HTML element can take many forms. In FIGS. 3 and 4, the canvas is the region on which the frame is drawn. Additionally, the canvas element can register interactions such as clicking and dragging, which in this case are configured to draw bounding regions wherever the user clicked. The canvas element also allows elements to be drawn programmatically (e.g., by a machine).

In the example shown, Display UI 1020 is presented in a browser and a browser-based overlaying HTML element is used. A browser-based implementation displays the video frames and an HTML canvas is overlaid over the video frames that are being displayed. The canvas is an HTML element that allows user interactions, enabling a user to input an annotation by drawing or painting a first image, element, box, or bounding region onto the canvas. In this manner, a user is able to interact by, for example, clicking and dragging a pointer to draw a box around an object in a video frame. An annotation or box received as input to the system defines a set of coordinates on an image or video frame in a sequence or series of video frames.

As shown in FIG. 10, information related to the object being tracked is sent to a remote server (e.g., Server 1034) via a network (e.g., Network 1025). The information sent to Server 1034 includes, for example, a sequence of video frames, an image number in the sequence (e.g., video frame number 6 out of a series of 120 video frames as shown in FIG. 4), and coordinates associated with an annotation or box around the object being tracked. In some embodiments, as an annotation is made or a box is drawn around an object, an object identifier or ID is associated with the annotation or box, and a post is sent to Server 1034 via Network 1025.

The first annotation defines or specifies a first set of coordinates. The first set of coordinates associated with the first annotation of the first bounding region is received by a tracker (e.g., Tracker 1030) on the server. In response to or based at least in part on the received coordinates, Tracker 1030 predicts a second set of coordinates associated with a location of the object in a second or subsequent video frame, the object having been annotated by the first bounding region in the first video frame.

In some cases, Tracker 1030 predicts a second set of coordinates on the second video frame in response to or based on comparing the first video frame to the second video frame. For instance, in some examples, a comparison of the first video frame and the second video frame is based on image information extracted from the first video frame and the second video frame. In other examples, the system predicts a location of the object in the second video frame by comparing a cropped region of the object in the first video frame to a cropped region of the object in the second video frame.

Additionally, the system 1000 automatically tracks an object using new architectures of Deep Learning technologies that go beyond typical Computer Vision algorithms like Convolutional Neural Networks on individual frames, to also encode the changes in pixel values between video frames, the content of a box around an object, and the content of boxes around other objects in the same image or video frame and dataset. Accordingly, in some cases, the system 1000 predicts a location of the object in a second or subsequent video frame in response to or based on at least one of: encoding changes in pixel values between video frames, the content of a bounding region around an object, and the content of bounding regions around other objects in the same image or video frame and dataset.

In this case, by applying a tracker (e.g., Tracker 1030), the system 1000 obtains a second bounding region of the object in the second or subsequent video frame in the series of video frames based at least in part on the prediction of the location of the object in the second video frame. Display UI 1020 is configured to display the first video frame, the first bounding region, and the second bounding region. As shown in FIG. 10, an output of Tracker 1030 is sent via Network 1025 and received as an input by Network Interface 1021 on the client 1024, which is connected to Display UI 1020. In this manner, Display UI 1020 receives a prediction of the location of the object in the second video frame from Tracker 1030 (e.g., a second set of coordinates on the second video frame), and in response to or based on the input received from Tracker 1030, displays the second bounding region on the second video frame. An example of such a display is provided by FIGS. 3 and 4. In particular, displays of a first video frame, a first bounding region, and a second bounding region are depicted and described with respect to FIGS. 3 and 4.

At 1050, the system 1000 outputs the second bounding region, which can be in the form of the box shown on the display 401 of FIG. 4 or in the form of a second set of coordinates that correspond to the second bounding region on the second video frame as returned by Tracker 1030.

In some embodiments and as shown in FIG. 10, the tracker comprises a plurality of trackers. For example, the system 1000 uses an open CV, computer vision library, and a number of different trackers. In this case, Tracker 1030 comprises a plurality of trackers (e.g., Booster Tracker 1031, Mil Tracker 1032, and Goturn Tracker 1033) that are available on Server 1034. A first set of coordinates associated with the first annotation of the first bounding region is received by each tracker in the plurality of trackers. Based at least in part on the received coordinates, each tracker (e.g., at 1031, 1032, and 1033 in FIG. 10) in the plurality of trackers predicts a second set of coordinates associated with a location of the object in a second or subsequent video frame, the object having been annotated by the first bounding region in the first video frame.

In some cases, each tracker (e.g., at 1031, 1032, and 1033 in FIG. 10) in the plurality of trackers predicts a second set of coordinates on the second video frame based on comparing the first video frame to the second video frame. For instance, in some examples, a comparison of the first video frame and the second video frame is based on image information extracted from the first video frame and the second video frame. In other examples, each tracker (e.g., at 1031, 1032, and 1033 in FIG. 10) in the plurality of trackers predicts the location of the object in the second video frame by comparing a cropped region of the object in the first video frame to a cropped region of the object in the second video frame.

Additionally, system 1000 automatically tracks an object using new architectures of Deep Learning technologies that go beyond typical Computer Vision algorithms like Convolutional Neural Networks on individual frames, to also encode the changes in pixel values between video frames, the content of a box around an object, and the content of boxes around other objects in the same image or video frame and dataset. Accordingly, in some cases, the system 1000 predicts a location of the object in a second or subsequent video frame in response to or based on at least one of: encoding changes in pixel values between video frames, the content of a bounding region around an object, and the content of bounding regions around other objects in the same image or video frame and dataset.

In the example depicted in FIG. 10, the system 1000 predicts the location of the object in the second video frame in response to or based on applying a plurality of trackers. In these embodiments, the prediction is based at least in part on selecting an output from one of the plurality of trackers. For example, each output from each of the plurality of trackers (e.g., at 1031, 1032, and 1033 in FIG. 10) is compared with an initial input or annotation (e.g., a first annotation of a first bounding region in a first video frame or a cropped version of an object being annotated). An output from a tracker includes an image of an object (e.g., a cropped image), a bounding region, or a set of coordinates that can be used to specify or designate an image or bounding region. In at least one example described above, a tracker output comprises a second set of coordinates associated with a location of the object in a second or subsequent video frame, the object having been annotated by the first bounding region in the first video frame.

Various different trackers are used in combination with open source libraries. Although a few specific trackers are described herein, the disclosed method and system are not limited to the use of any specific trackers and other trackers can be used without limiting the scope of the disclosed technique.

In the example shown, the system 1000 uses Boosting Tracker 1031, Mil Tracker 1032, and Goturn Tracker 1033. Other trackers can be used in other embodiments. Each tracker can work in different ways to provide a prediction of a location of the object in a subsequent frame based on information related to or associated with the object being tracked including information extracted from the first video frame. For instance, Boosting Tracker 1031 and Mil Tracker 1032 consider information from a radius around a region or vicinity of a location of the object being tracked to find a match of that object, comparing two video frames (e.g., a first video frame and a second or subsequent video frame) to predict a location of the object being tracked on the second video frame. In contrast, Goturn Tracker 1033 is based on a deep learning model or a pre-trained model that can adapt shapes, make perspective changes, and perform rotation and scaling to images to determine its own prediction of where the object will be in the second video frame.

In some embodiments, the system 1000 determines a similarity metric in response to or based at least in part on comparing each output from each of the plurality of trackers with an initial input or annotation or with some other benchmark. For example, the system 1000 compares a tracker's output to an initial input or other benchmark and returns or outputs a similarity metric. The similarity metric indicates or represents a similarity between the two images being compared. In some embodiments, a library (e.g., Library 1035) of previously saved images is used to provide a benchmark image for comparing the output or predictions from each tracker. The similarity metric can be a number on a scale, a percentage, or any other value that indicates a similarity between two images. In the example shown, Library 1035 exists on the server side 1034, but in some embodiments, Library 1035 is implemented on the client side 1024 and accessed by Comparator 1040 to perform comparisons.

In some examples, the images used in the comparison are cropped versions of an object. For example, a first annotation of a first bounding region of an object in a first video frame generates an image of the object which is cropped before being compared to other images. Similarly, a set of coordinates output from a tracker that predicts a location of an object in a subsequent video frame generates an image of the object in the subsequent video frame which is cropped before being compared. Finally, images of objects are cropped before being saved as benchmarks for comparison in Library 1035.

In the example of FIG. 10, Comparator 1040 compares the output of each tracker (e.g., at 1031, 1032, and 1033) in the plurality of trackers to an initial input or other benchmark and determines a similarity metric (e.g., a number) that indicates or represents the similarity between the elements (e.g., images) being compared. In this example, Comparator 1040 determines a similarity metric for each output of each tracker (e.g., at 1031, 1032, and 1033) in the plurality of trackers. Comparator 1040 then selects the tracker output determined to be most similar to the initial input or benchmark. Comparator 1040 returns the selected tracker output as the prediction of the location of the object in the second or subsequent video frame. The selected tracker output, which in this case is the output of Comparator 1040, is used by the system 1000 to obtain a second bounding region of the object in the second or subsequent video frame. The selected tracker output is also an output at 1050 of the system 1000 that is used in some embodiments to train machine learning models that learn not only what the object being tracked looks like (e.g., a car or a person) but also the object's motion over time.

In some cases, each tracker (e.g., at 1031, 1032, and 1033 in FIG. 10) in the plurality of trackers also provides a confidence score of the prediction. In this case, the closer the match between the initial annotation or other benchmark representing the object being tracked and the output of a particular tracker, the more accurate the tracker's prediction of the location of the object in a second or subsequent video frame, and the higher the confidence score associated with the tracker's prediction.

In some embodiments, the system 1000 sets a confidence threshold wherein, if a confidence score received from a tracker associated with the tracker's prediction is below the confidence threshold, the system 1000 provides an indication or an alert to the user that the tracker's prediction may be inaccurate. The indication or alert can be implemented in various ways and take different forms. For example, the second bounding region or box corresponding to the tracker's prediction of the location of the object in the second or subsequent video frame may be shown in a different color or highlighted, or the object identifier or ID associated with the object being tracked in the prediction may be highlighted on the display. Additionally, in some instances, the confidence threshold is set by the user while in other cases, it is determined by the system. By providing a confidence score for each prediction (e.g., each predicted bounding region), the system increases efficiency by focusing a user's attention and efforts on areas of the video where there may be a tracking error rather than having the user check each prediction or make each annotation manually.

In some embodiments, as shown in the following figures, a technique is disclosed that incorporates human input into an automated video annotation and video tracking system by providing a feedback loop for human input to improve object tracking. As an example, a video is received as an input, pre-processed to break the video up into a series of video frames, and the frames loaded in a sequential order and displayed on a display of a graphical user interface configured to receive a video annotation. In particular, a first video frame in the series of video frames is presented (e.g., on a display) and a first annotation of a first bounding region of an object in the first video frame (whether a user-inputted annotation or a machine-generated annotation) is received. A location of the object in a second video frame is predicted and a second bounding region of the object in the second video frame is obtained and output by the system based at least in part on the prediction.

In some cases, the user views the second video frame on the display and determines whether the prediction as reflected by the second bounding region shown on the second video frame is sufficiently accurate. At this point, the user can choose whether or not to adjust the second bounding region. If the user chooses to make a user adjustment, the user adjusts the second bounding region, for example, by moving or drawing a new box around the object as it appears in the second video frame. The user adjustment is received and displayed by the system on the second video frame.

In these examples, an interface is configured to display the first video frame and the first bounding region as well as the second video frame, the second bounding region, and the user adjustment. Exemplary displays of a first video frame and a first bounding region, and a second video frame and a second bounding region, and user adjustments are depicted and described with respect to FIGS. 9A-9C.

Figure 11A:
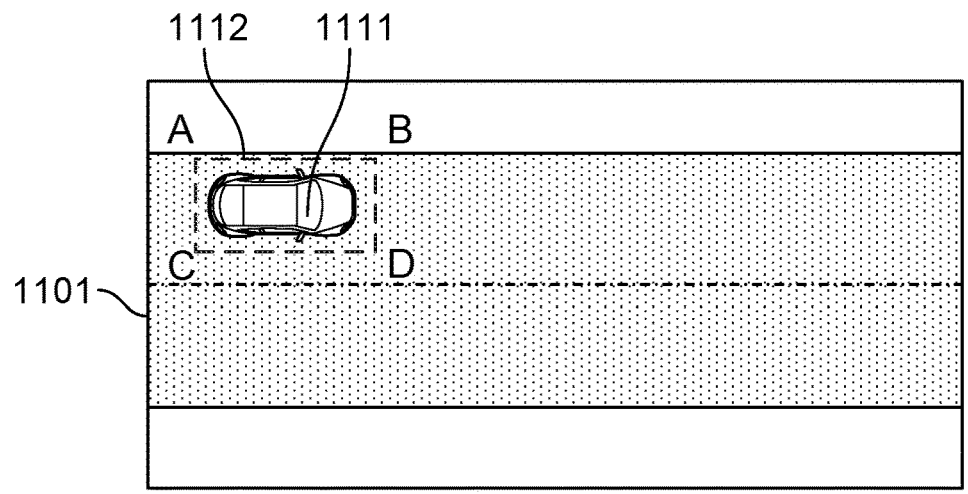
FIG. 11A is a depiction of a first video frame that includes an object to be tracked.

FIG. 11A is a depiction of a first video frame 1101 that includes an object to be tracked, in this case a car shown at 1111 in the first video frame 1101. A first annotation received by the system is shown as a rectangular box at 1112 around the object 1111. As shown in FIG. 11A, the first annotation 1112 specifies or defines a first set of coordinates ABCD, wherein each letter designates a coordinate specifying a corner of the box at 1112.

Figure 11B:
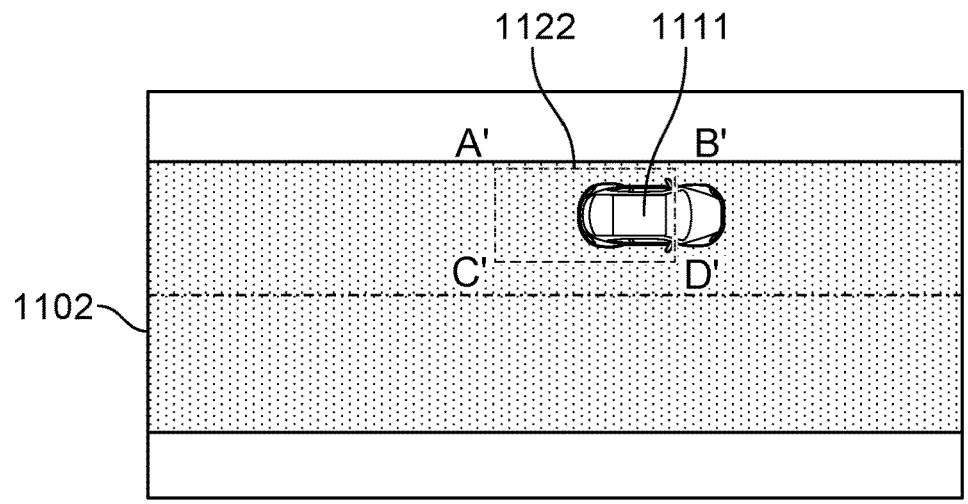
FIG. 11B is a depiction of a second video frame that includes the object being tracked in FIG. 11A along with a second bounding region output by the system.

FIG. 11B is a depiction of a second video frame 1102 that includes the object being tracked, in this case the car shown at 1111 in the second video frame 1102, along with a second bounding region 1122 output by the system. As shown in FIG. 11B, the second bounding region 1122 specifies or defines a second set of coordinates A'B'C'D', wherein each letter designates a coordinate specifying a corner of the box at 1122.

Comparing the first video frame 1101 of FIG. 11A with the second video frame 1102 of FIG. 11B, we note that the car 1111 has moved. In other words, the object's location in the first video frame is different from the object's location in the second video frame.

As noted above, FIG. 11B shows a second bounding region 1122 of the object in the second video frame 1102 in the series of video frames. The second bounding region 1122 is obtained based at least in part on the system's prediction of the location of the object 1111 in the second video frame 1102. Note that in the example shown, the system's prediction is not quite accurate as reflected by the second bounding region 1122 that appears to lag behind the actual location of the object 1111 in the second video frame 1102. In the case where the system provides a confidence score of its prediction and sets a confidence threshold, an indication or an alert may be provided to the user that the system's prediction may be inaccurate. Here, if the confidence score of the system's prediction resulting in an output of the second bounding region 1122 is lower than the confidence threshold, the system would alert the user of the possible inaccuracy. In response to the alert from the system, the user can adjust the second bounding region by moving or drawing a new box around the object 1111 as it appears in the second video frame 1102. The user adjustment is received and displayed by the system on the second video frame.

Figure 11C:
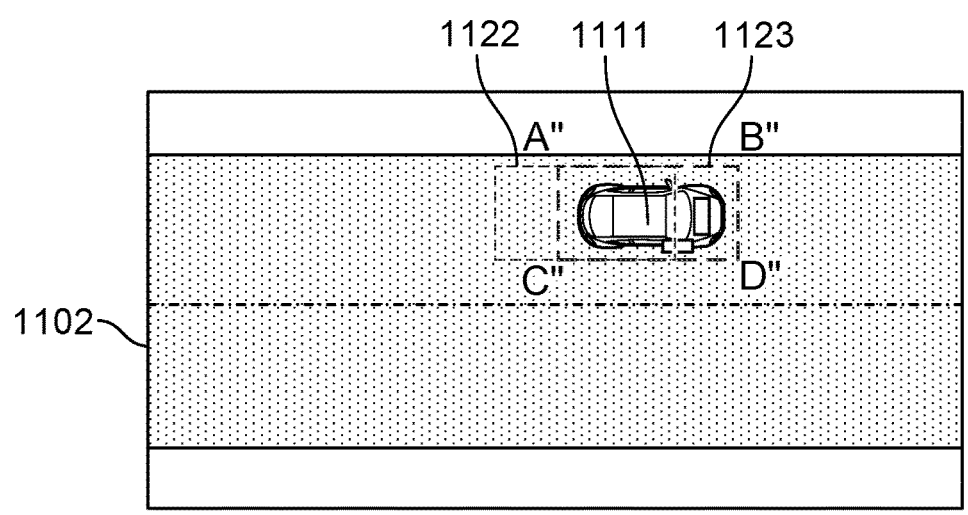
FIG. 11C is a depiction of a second video frame that includes the object being tracked in FIGS. 11A and 11B along with the second bounding region output by the system and a user adjustment.

FIG. 11C is a depiction of the second video frame 1102 of FIG. 11B that includes the object being tracked, in this case the car shown at 1111 in the second video frame 1102, the second bounding region 1122 output by the system, and a user adjustment 1123. As shown in FIG. 11C, the user adjustment 1123 specifies or defines a third set of coordinates A"B"C"D", wherein each letter designates a coordinate specifying a corner of the box at 1123.

Comparing the first video frame 1101 of FIG. 11A with the second video frame 1102 of FIG. 11C, we note that: (1) the car 1111 has moved—that is, the object's location in the first video frame is different from the object's location in the second video frame; (2) the second bounding region 1122 predicted and output by the system is inaccurate in that it appears to lag behind the actual location of the object 1111 in the second video frame 1102; and (3) the user adjustment 1123 more accurately reflects the actual location of the object 1111 in the second video frame 1102. Accordingly, in this case, the user has made a correction to the system's prediction that more accurately tracks the object 1111. Examples of methods that incorporate human input such as a user correction or a user adjustment to improve object tracking accuracy are described with respect to the following figures.

Figure 12:
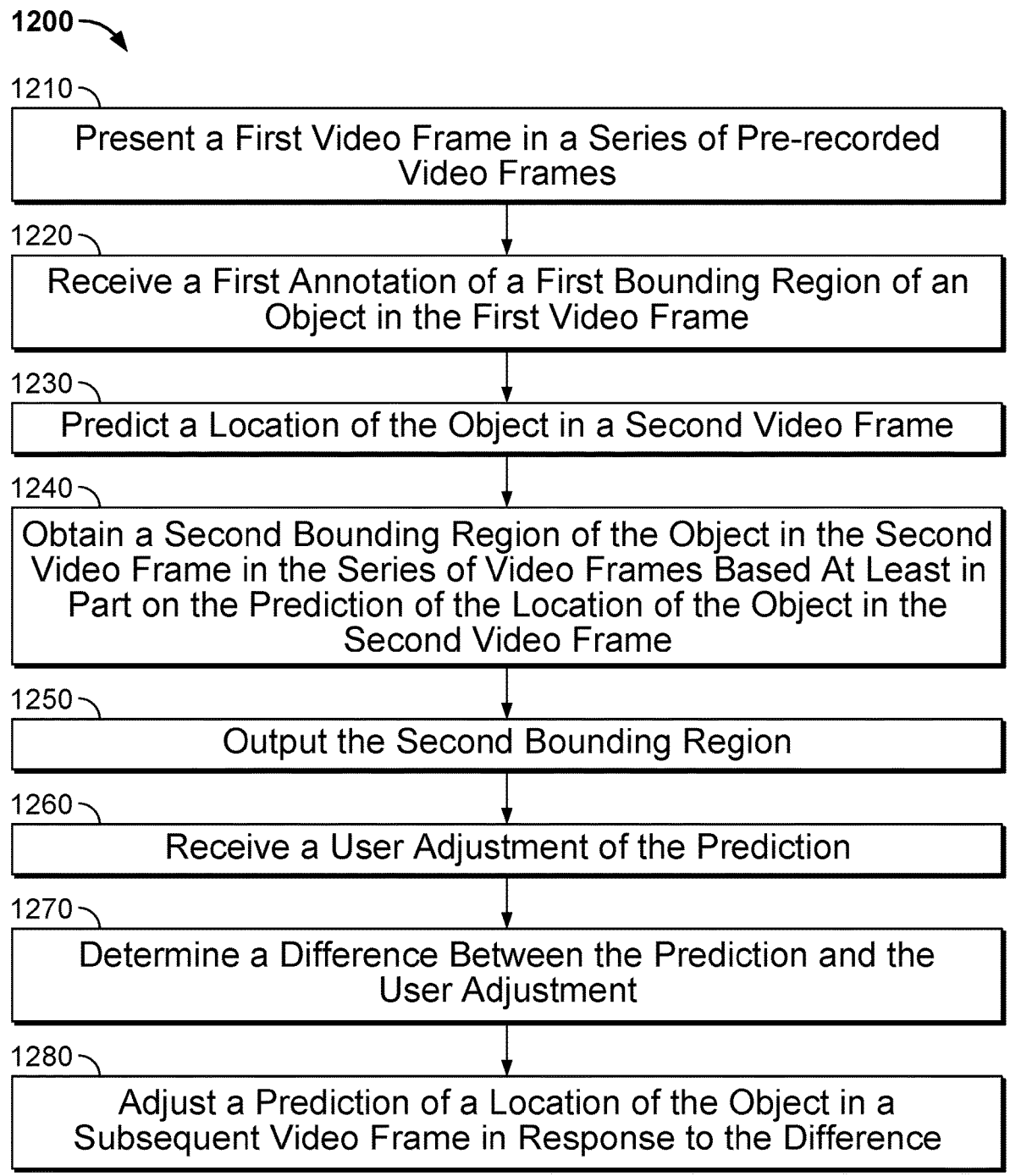
FIG. 12 is a flowchart of an embodiment of a method for video annotation that incorporates human input to improve the system's performance.

FIG. 12 is a flowchart of an embodiment of a method 1200 for video annotation that incorporates human input to improve the system's performance. As described above, a video is received as an input, pre-processed to break the video up into a series of pre-recorded video frames, and the frames loaded in a sequential order and displayed on a display of a graphical user interface configured to receive a video annotation.

As shown in FIG. 12, a first video frame in a series of pre-recorded video frames is presented at 1210 and a first annotation of a first bounding region of an object in the first video frame is received at 1220. In some cases, the first bounding region is a rectangular box (e.g., 1112 of FIG. 11A) that specifies a first set of coordinates (e.g., ABCD).

At 1230, a location of the object in the second video frame is predicted. At 1240, a second bounding region of the object in the second video frame in the series of video frames is obtained based at least in part on the prediction of the location of the object in the second video frame. In some cases, the second bounding region is a rectangular box (e.g., 1122 of FIG. 11B) that specifies a second set of coordinates (e.g., A'B'C'D'). At 1250, the system outputs the second bounding region (e.g., the second set of coordinates A'B'C'D').

At 1260, a user adjustment of the prediction is received. A user adjustment can be made by moving or adjusting the second bounding region or by drawing a new box around the object as it appears in the second video frame using a graphical user interface as described herein. In some cases, the user adjustment is a rectangular box (e.g., 1123 of FIG. 11C) that specifies a third set of coordinates (e.g., A"B"C"D"). In some embodiments, the system outputs the user adjustment (e.g., the third set of coordinates A"B"C"D").

At 1270, a difference between the prediction and the user adjustment is determined. For example, in some cases the system determines a difference between the second set of coordinates A'B'CD' associated with the second bounding region and the third set of coordinates A"B"C"D" associated with the user adjustment. The difference can be computed in many ways including, for example, a Euclidean distance as a measure between coordinates. Note that since the second set of coordinates A'B'CD' will always be the coordinates returned by the system and the third set of coordinates A"B"C"D" will always be the user input, it does not matter which direction the object is moving. In some cases, a Root Mean Squared function is applied to make sure that the value of the difference is always positive to avoid negative values.

At 1280, a prediction of a location of the object in a subsequent video frame is adjusted in response to the difference.

In some cases, on any given frame, the output of the system includes a predicted bounding region or box (e.g., a second bounding region in a given video frame representing a prediction of a location of the object being tracked in the given video frame), the coordinates of the predicted bounding region (e.g., a second set of coordinates associated with or specifying the second bounding region), object labels or tags indicating a type or category of object (e.g., person or car) for the object being tracked in the given frame, and an indicator or flag for whether or not the object being tracked is visible in the given frame. In this case, the output of the system also includes the user adjustment (e.g., the third set of coordinates A"B"C"D") and the difference between the prediction and the user adjustment. Any one or more of the system outputs can be used in different combinations as inputs to a model to inform its predictions of a location of the object in subsequent video frames and to improve the object tracking accuracy of the system.

Figure 13:
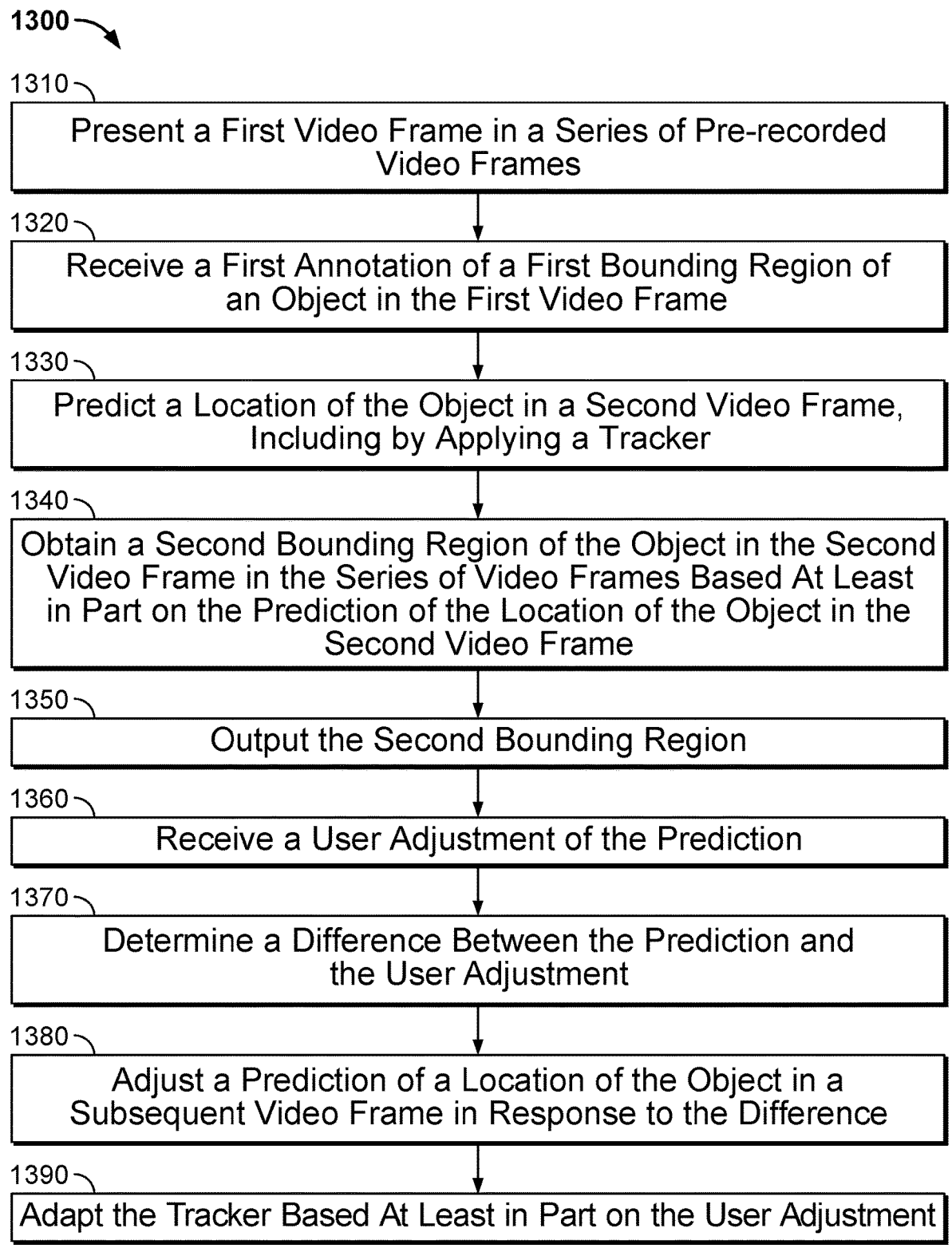
FIG. 13 is a flowchart of an embodiment of a method for video annotation that incorporates human input to improve the system's performance and includes a tracker.

In some embodiments, predicting a location of the object in the second video frame includes applying a tracker. FIG. 13 is a flowchart of an embodiment of a method 1300 for video annotation that incorporates human input to improve the system's performance and includes a tracker.

As described above, a video is received as an input, pre-processed to break the video up into a series of pre-recorded video frames, and the frames loaded in a sequential order and displayed on a display of a graphical user interface configured to receive a video annotation.

As shown in FIG. 13, method 1300 comprises presenting a first video frame in a series of pre-recorded video frames at 1310 and receiving a first annotation of a first bounding region of an object in the first video frame at 1320. In some cases, the first bounding region is a rectangular box (e.g., 1112 of FIG. 11A) that specifies a first set of coordinates (e.g., ABCD).

At 1330, the method predicts a location of the object in the second video frame, including by applying a tracker. Examples describing the application of various trackers to predict a location of the object in the second video frame are provided herein with respect to FIGS. 6, 7, and 8.

In this case, the first set of coordinates associated with the first annotation of the first bounding region (e.g., ABCD) is received by the tracker. Based at least in part on the received coordinates, the tracker predicts a second set of coordinates associated with a location of the object in a second or subsequent video frame, the object having been annotated by the first bounding region in the first video frame.

In some cases, the tracker comprises a plurality of trackers. In these cases, the first set of coordinates associated with the first annotation of the first bounding region (e.g., ABCD) is received by a plurality of trackers. Based at least in part on the received coordinates, each of the trackers in the plurality of trackers predicts a second set of coordinates associated with a location of the object in a second or subsequent video frame, the object having been annotated by the first bounding region in the first video frame.

In some instances, each tracker in the plurality of trackers predicts a second set of coordinates on the second video frame based on comparing the first video frame to the second video frame. For instance, in some examples, a comparison of the first video frame and the second video frame is based on image information extracted from the first video frame and the second video frame. Extracted image information includes, for example, encoding changes in pixel values between video frames, the content of a bounding region around an object, and the content of bounding regions around other objects in the same image or video frame and dataset. In some cases, changes in pixel values between video frames or changes in content of bounding regions around an object between two frames can be used as input to a tracker trained to distinguish between these changes in order to make a prediction with respect to the location of the object being tracked. In other examples, each tracker in the plurality of trackers predicts the location of the object in the second video frame by comparing a cropped region of the object in the first video frame to a cropped region of the object in the second video frame.

In cases applying a plurality of trackers, a prediction of a location of the object in the second video frame is based at least in part on selecting an output from one of the plurality of trackers. For example, each output from each of the plurality of trackers is compared with an initial input or annotation (e.g., a first annotation of a first bounding region in a first video frame or a cropped version of an object being annotated). An output from a tracker includes an image of an object (e.g., a cropped image), a bounding region, or a set of coordinates that can be used to specify or designate an image or bounding region. In at least one example described above, a tracker output comprises a second set of coordinates associated with a location of the object in a second or subsequent video frame, the object having been annotated by the first bounding region in the first video frame.

An output of each tracker in the plurality of trackers is compared to an initial input or other benchmark and a similarity metric is determined that indicates or represents the similarity between the elements (e.g., images) being compared. Specifically, a similarity metric is determined for each output of each tracker in the plurality of trackers. In some cases, the similarity metric is based on the average pixel value in the initial bounding region (e.g., a first bounding region in a first frame). The predicted bounding regions returned by each of the trackers have an associated average pixel value that can be used to compare similarity.

The tracker output determined to be most similar to the initial input or benchmark is selected as the prediction of the location of the object in the second or subsequent video frame. The selected tracker output is used to obtain a second bounding region of the object in the second or subsequent video frame. The selected tracker output is also an output of the system used in some embodiments to train machine learning models.

At 1340, a second bounding region of the object in the second video frame in the series of video frames is obtained based at least in part on the prediction of the location of the object in the second video frame. Here, the prediction is made by the tracker, or in some cases, a plurality of trackers, wherein a tracker output from one of the plurality of trackers is selected as the prediction. In some cases, the second bounding region is a rectangular box (e.g., 1122 of FIG. 11B) that specifies a second set of coordinates (e.g., A'B'C'D'). At 1350, the system outputs the second bounding region (e.g., the second set of coordinates A'B'CD' received from the tracker).

At 1360, a user adjustment of the prediction by the tracker (or in some cases, the prediction selected from an output from one of a plurality of trackers) is received. A user adjustment can be made by moving or adjusting the second bounding region or by drawing a new box around the object as it appears in the second video frame using a graphical user interface as described herein. In some cases, the user adjustment is a rectangular box (e.g., 1123 of FIG. 11C) that specifies a third set of coordinates (e.g., A"B"C"D"). In some embodiments, the system outputs the user adjustment (e.g., the third set of coordinates A"B"C"D").

At 1370, a difference between the prediction of the tracker (or in some cases, the prediction selected from an output from one of a plurality of trackers) and the user adjustment is determined. For example, in some cases the system determines a difference between the second set of coordinates A'B'CD' associated with the second bounding region received from the tracker and the third set of coordinates A"B"C"D" associated with the user adjustment. At 1380, the tracker adjusts a prediction of a location of the object in a subsequent video frame in response to the difference. In the case that includes applying a plurality of trackers, one or more of the plurality of trackers adjusts its prediction of a location of the object in a subsequent video frame in response to the difference. At 1390, the tracker is adapted based at least in part on the user adjustment. In the case that includes applying a plurality of trackers, one or more of the plurality of trackers is adapted based at least in part on the user adjustment.

In the example shown, a tracker (or in some cases, a plurality of trackers) is applied to provide a prediction of a location of the object in the second video frame, which is displayed by the system as a second bounding region in the second video frame. A user can view a display of the second video frame that includes the second bounding region and readjust the second bounding region to more accurately track the object of interest. In this manner, the system receives a human input (e.g., the user adjustment of the second bounding region) and the tracker or at least one of a plurality of trackers can take into account the nature of that human input. For instance, by determining a difference between its prediction associated with the second bounding region and the user adjustment and attempting to minimize that difference in a next iteration, the tracker applies human feedback to iterate and improve on future predictions of the location of the object in subsequent frames.

In some embodiments, the tracker or at least one of a plurality of trackers includes a model that can be adapted as additional data is received. For example, an error function is defined based at least in part on the difference between the tracker's prediction of a location of the object in the second video frame (e.g., the second bounding region specified by a second set of coordinates A'B'C'D') and the user adjustment on the second video frame. In some cases, the user adjustment (e.g., as specified by a third set of coordinates A"B"C"D") provides a ground truth or true value used to train the model, and a back propagation method is applied to adjust model weights using an error function based at least in part on the difference between the model's prediction and the true value (e.g., the difference between the second set of coordinates A'B'C'D' and the third set of coordinates A"B"C"D"). The ability to adjust the model weights in response to an error function is part of a deep learning process. Here, the tracker is trained on a time series provided by the two images (e.g., a first video frame and a second video frame or any subsequent video frame) as well as the human input provided by the user adjustment.

In some cases, the system provides a user adjustment indicator or flag (e.g., a true/false or Boolean value) that indicates whether a user has made a user adjustment (e.g., by adjusting the second bounding region in the second video frame). For example, the user adjustment indicator is triggered by determining whether the second set of coordinates and the third set of coordinates exactly match (e.g., whether A'B'C'D'=A"B"C"D"). If the second set of coordinates and the third set of coordinates do not match, the user adjustment indicator or flag is set to a value of "true."

In some examples, the user adjustment indicator is provided as an additional input to the model along with information extracted from each of the two frames (e.g., a first video frame and a second video frame or any subsequent video frame). Information extracted from the video frames includes encoding changes in pixel values between video frames, the content of a bounding region around an object, and the content of bounding regions around other objects in the same image or video frame and dataset. The information provided as inputs to the model includes the outputs of the system as described herein, such as the first set of coordinates associated with the first annotation of the first bounding region (e.g., ABCD), a predicted bounding region or box (e.g., a second bounding region), the coordinates of the predicted bounding region (e.g., a second set of coordinates A'B'C'D'), object labels or tags indicating a type or category of object (e.g., person or car) for the object being tracked in the given frame, an indicator or flag for whether or not the object being tracked is visible in the given frame, a user adjustment (e.g., the third set of coordinates A"B"C"D"), a user adjustment indicator or flag, and a difference between the prediction and the user adjustment.

In some embodiments, the tracker or at least one of a plurality of trackers is adapted based at least in part on the user adjustment, including by adjusting a model as predictions are made. Here, the model in the tracker is dynamic in the sense that it has an ability to actively learn or be trained (e.g., model weights are changing or being adjusted) as the user is using the system to complete tasks. In these embodiments, the model is able to improve its predictions by, for example, changing or adjusting the model weights in real time as a user is using the system to annotate video and track objects in video.

In other examples, the tracker or at least one of a plurality of trackers comprises a model configured to adapt based at least in part on transfer learning. Transfer learning is a research problem in machine learning that focuses on storing knowledge gained while solving one problem and applying it to a different but related problem. For example, knowledge gained while learning to recognize cars could apply when trying to recognize cells. In particular, for a specific use case such as in the case of a specific type of data such as cell data, a generic tracker trained on other datasets to recognize other objects (e.g., a car or a person) may not perform well in a new application that requires identifying cells. Thus, while models used in the trackers may include useful properties, for instance, enabling the models to distinguish object boundaries and shapes, they are not trained on data directed specifically to cells.

In these examples, transfer learning is used to adapt the object trackers to provide a better result. In particular, a tracker model is retrained on a new set of data for a specific use case such that the model will track objects better for that specific use case. First, a different type of input data (e.g., cell data) directed to tracking a new type of object (e.g., a cell) is received by the system for example, in the form of a video. A tracker model is retrained for the new application by using the system described herein to incorporate human input through a user adjustment that corrects or adjusts specific locations of where the bounding regions should be in situations where the system inaccurately predicts the location of the object (in this case, a cell). Thus, even though the tracker model has been previously trained to recognize cars, a retrained tracker model using the cell data allows the model to use knowledge previously acquired from tracking cars (e.g., knowledge of boundaries, shapes, and colors), and apply it to a different type of application. In the case of applying transfer learning to object tracking, the models in the trackers are trained with new data to improve the prediction result. Thus, the same process used to improve tracker output if not satisfactory or sufficiently accurate can be used for transfer learning to retrain a model based on data for a different application directed to objects of a different type or category.

Users can quickly go back and forth in the video (scrub) to check whether the object has been tracked correctly, and edit the box wherever it is incorrect. An important feature of the disclosed technique is that it can identify where a prediction might not be accurate, and automatically point the user to specific video frames and specific objects within a video frame where predictions for the object being tracked might have errors or inaccuracies that require human correction. The method and system disclosed herein can also identify potential errors by users resulting from annotations or adjustments made by a current user or a previous user on the same image or video frame. In this case, the system automatically points a user to specific video frames and specific objects within a video frame which are likely to reflect human errors or inaccuracies in order to obtain as much human input as possible to reach a correct outcome.

In the case where a tracker includes a machine-learning model with multiple layers, transfer learning will take some layers from an existing model (trained on one type of data) and add in new layers with the new type of data. For example, the original model might be a model build on different images and different use cases, while the new data might be directed to a different use case. An advantage of using transfer learning is that building a model directed or adapted to handling the new application does not require the original data. Instead, the model can be retrained to identify other objects by retraining only last layers of the model (e.g., the last layers of a neural network) with the new data. Thus, although the original model might have been trained over millions of images on the earlier layers, only the last layer or layers need to be retrained to focus on subtle differences, which requires a fewer set of data points. Transfer learning takes advantage of previous training over millions of images while retraining only the last layers using a smaller data set specifically directed to the new application.

Transfer learning thus provides at least two advantages. First, an existing model can be used to obtain an output faster than building an entirely new model. Second, new data can be applied to refine the existing model to address a different application and to improve the model's predictions. Here, an existing model is trained on datasets for a new application and the model's performance is observed and evaluated based on the model's predictions for data directed to the new application. If the model's performance proves to be insufficient or not accurate enough for the new application, only the last layers of the model need to be retrained using the new data set. This process can be repeated for different data received and for each new application, an existing model can be retrained. In this manner, the method and system described herein provide a mechanism for retraining models resulting in improved accuracy, throughput, and cost by requiring fewer human annotations and fewer data points in the new data set.

Moreover, the disclosed technique can use other existing datasets with boxes to help track in the current image. It can do this completely using the other dataset, or by a combination of the other datasets and the current one through transfer learning. Transfer learning builds an architecture from one dataset, and then the last layer or set of layers of that network can be retrained with new data. The user can select whether they wish to use transfer learning, and also select the base dataset for transfer learning, for example, they might use a dataset that is also about cars if they are tracking cars in their new dataset.

In some embodiments, the user adjustment comprises a plurality of user adjustments from multiple users. In these embodiments, the tracker (or in some cases, at least one of a plurality of trackers) is adapted based at least in part on an aggregate metric of the plurality of user adjustments.

Various methods can be used to aggregate multiple user adjustments from multiple contributors. In some cases, an aggregate metric is determined based at least in part on a weighted majority vote or on a threshold of agreement among a plurality of users. In other cases, the aggregate metric is determined based at least in part on a score for each user.

In the case of determining an aggregate metric based at least in part on a weighted majority vote, each user adjustment is weighted by a historical accuracy over time or an accuracy for a given task associated with the user providing the user adjustment. In some examples, a historical accuracy for a given user is determined by evaluating the user's performance of manually annotating objects over time and comparing the user's manual annotations with a standard or benchmark. Similarly, a given user's accuracy for a given task is determined by taking a large number of videos annotated in a certain way and defining a specific task or job associated with those annotations.

As an example, annotating objects in videos is a job wherein a user performing the annotations can be measured in terms of his or her accuracy. In some cases, a user's accuracy is measured by having the user unknowingly complete assignments for which there are already ground truth annotations (e.g., a set of annotations considered to be correct) and comparing the user's annotations against the ground truth annotations. The ground truth annotations are created by a human, often by the original researcher or individual who is requesting the annotations.

In the case of determining an aggregate metric based at least in part on a threshold of agreement among a plurality of users, the system dynamically receives input from multiple users until a certain threshold of agreement is reached. An example threshold metric is intersection over union. In particular, the amount of an intersecting region (e.g., the intersection of regions taken over the plurality of users) versus a union region (e.g., the union of regions over the plurality of users) is calculated and the ratio (e.g., intersecting region/union region) is compared to a threshold. More specifically, the number of pixels in the intersecting region (as determined by an intersection of the set of individual regions for each of the plurality of users) is divided by the number of pixels in the union region (as determined by a union of the set of individual regions for each of the plurality of users). If this value provided by the ratio of the intersecting region to union region is above a certain threshold, then the bounding regions of the users are aggregated. The bounding regions can be aggregated in multiple ways, for example taking just the intersecting region, just the union region, or an average of the regions over the plurality of users.

In the case of determining an aggregate metric based at least in part on a score for each user, a user's score can be determined based on a historical accuracy of the user's performance over time or on the user's accuracy for a given task. In some cases, two scores for each user can be determined and adjusted in real time as the user is performing annotations using the system and method as described herein.

The technique described herein addresses the technical problem of annotating large volumes of images to generate large amounts of training data, for example, large data sets of images of objects for training machine learning models for various applications. The disclosed technique provides an automated tool for annotating large volumes of images, providing improved throughput and efficiency over existing methods while maintaining a degree of accuracy comparable to a human annotator. In particular, the disclosed systems and methods provide an automated annotated object tracking tool that allows machine-learning teams to annotate an object within a video frame and have that annotation persist across frames as the annotated object is tracked within the video, still ensuring that every frame is accurately reviewed by a human where high quality annotation is required. This technical solution incorporates human feedback via a user adjustment that allows the tool to adapt and improve its accuracy in tracking an annotated object across a sequence of video frames. The disclosed technique thus provides an ability to generate large amounts of data that accurately depict objects of interest that can be used to train machine learning models to recognize these objects. The capability of incorporating human feedback is essential to annotate video content in applications such as autonomous vehicles, security surveillance, and media entertainment. Without the automated annotated object tracking capability, the cost and time required to annotate individual frames in video is prohibitive and makes artificial intelligence (AI) applications that need to understand objects moving through time and space untenable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for annotation comprising:
   a processor configured to:
      present a first frame in a series of pre-recorded frames;
      receive a first annotation of a first bounding region of an object in the first frame;
      predict a location of the object in a second frame in the series of pre-recorded frames;
      obtain a second bounding region of the object in the second frame in the series of pre-recorded frames based at least in part on the prediction of the location of the object in the second frame;
      output the second bounding region;
      receive a user adjustment of the prediction;
      determine a difference between the prediction and the user adjustment; and
      adjust a prediction of a location of the object in a subsequent frame in response to the difference; and
   a memory coupled to the processor, configured to provide the processor with instructions.

2. The system of claim 1 wherein the first annotation is input by a user.

3. The system of claim 1 wherein the processor is further configured to determine the first annotation.

4. The system of claim 1 wherein the object's location in the first frame is different from the object's location in the second frame.

5. The system of claim 1 wherein the processor is further configured to predict the location of the object in the second frame including by applying a tracker.

6. The system of claim 1 wherein the processor is further configured to:
   predict the location of the object in the second frame including by applying a tracker; and
   provide a confidence score of the prediction.

7. The system of claim 1 wherein the processor is further configured to predict the location of the object in the second frame including by applying a plurality of trackers.

8. The system of claim 1 wherein the processor is further configured to predict the location of the object in the second frame including by applying a plurality of trackers, wherein the prediction is based at least in part by selecting an output from one of the plurality of trackers.

9. The system of claim 1 wherein the processor is further configured to predict the location of the object in the second frame including by comparing a cropped region in the first frame to a cropped region in the second frame.

10. A system for annotation comprising:
a processor configured to:
present a first frame in a series of pre-recorded frames;
receive a first annotation of a first bounding region of an object in the first frame;
predict a location of the object in a second frame in the series of pre-recorded frames including by applying a tracker;
receive a user adjustment of the prediction;
determine a difference between the prediction and the user adjustment;
adjust a subsequent prediction of a location of the object in a subsequent frame in response to the difference; and
adapt the tracker based at least in part on the user adjustment; and
a memory coupled to the processor, configured to provide the processor with instructions.

11. The system of claim 10 wherein the processor is further configured to adapt the tracker based at least in part on the user adjustment, including by adjusting a model online as subsequent predictions are made.

12. The system of claim 10, wherein the user adjustment comprises a plurality of user adjustments from multiple users and wherein the difference comprises a plurality of differences between the prediction and each one of the plurality of user adjustments from multiple users.

13. The system of claim 10, wherein the user adjustment comprises a plurality of user adjustments from multiple users and wherein the processor is further configured to:
determine an aggregate adjustment based on the user adjustment;
determine a difference between the prediction and the aggregate adjustment;
adjust a subsequent prediction of a location of the object in a subsequent frame in response to the difference between the prediction and the aggregate adjustment; and
adapt the tracker based on at least one of the user adjustment or the aggregate adjustment.

14. The system of claim 13 wherein the aggregate adjustment is determined based at least in part on a weighted majority vote or on a threshold of agreement among a plurality of users.

15. The system of claim 13 wherein the aggregate adjustment is determined based at least in part on an annotation score for each user.

16. The system of claim 1 wherein the processor is further configured to:
output information pertaining to the second bounding region to a machine learning model; and
associate an identifier with the object, the first bounding region, and the second bounding region.

17. The system of claim 1 wherein the processor is further configured to:
predict the location of the object in the second frame including by applying a tracker, wherein the tracker comprises a model configured to adapt based at least in part on transfer learning.

18. A method for annotation comprising:
presenting a first frame in a series of pre-recorded frames;
receiving a first annotation of a first bounding region of an object in the first frame;
predicting a location of the object in a second frame in the series of pre-recorded frames;
obtaining a second bounding region of the object in the second frame in the series of pre-recorded frames based at least in part on the prediction of the location of the object in the second frame;
outputting the second bounding region;
receiving a user adjustment of the prediction;
determining a difference between the prediction and the user adjustment; and
adjusting a prediction of a location of the object in a subsequent frame in response to the difference.

19. A computer program product for annotation, the computer program product being embodied in a tangible computer readable storage medium and comprising computer instructions for:
presenting a first frame in a series of pre-recorded frames;
receiving a first annotation of a first bounding region of an object in the first frame;
predicting a location of the object in a second frame in the series of pre-recorded frames;
obtaining a second bounding region of the object in the second frame in the series of pre-recorded frames based at least in part on the prediction of the location of the object in the second frame;
outputting the second bounding region;
receiving a user adjustment of the prediction;
determining a difference between the prediction and the user adjustment; and
adjusting a prediction of a location of the object in a subsequent frame in response to the difference.

* * * * *